US011648939B2

(12) United States Patent
Crego et al.

(10) Patent No.: US 11,648,939 B2
(45) Date of Patent: *May 16, 2023

(54) COLLISION MONITORING USING SYSTEM DATA

(71) Applicant: Zoox, Inc., Foster City, CA (US)

(72) Inventors: Andrew Scott Crego, Foster City, CA (US); Siavosh Rezvan Behbahani, Redwood City, CA (US); Ali Ghasemzadehkhoshgroudi, Foster City, CA (US); Sai Anurag Modalavalasa, Foster City, CA (US); Andreas Christian Reschka, Foster City, CA (US); Lingqiao Qin, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/683,005

(22) Filed: Nov. 13, 2019

(65) Prior Publication Data

US 2021/0139024 A1 May 13, 2021

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *G06V 20/58* (2022.01);
(Continued)

(58) Field of Classification Search
CPC .... B60W 30/08; B60W 30/09; B60W 30/095; B60W 30/0953; B60W 30/0956;
(Continued)

(56) References Cited

U.S. PATENT DOCUMENTS 8,948,955 B2 2/2015 Zhu et al.
9,568,915 B1 * 2/2017 Berntorp ............. G05D 1/0214
(Continued)

FOREIGN PATENT DOCUMENTS

WO WO2013138000 A1 9/2013

OTHER PUBLICATIONS

Office Action for U.S. Appl. No. 16/682,971 dated May 18, 2021, Crego, "Collision Monitoring Using Statistic Models", 25 pages.
(Continued)

*Primary Examiner* — Russell Frejd
*Assistant Examiner* — Brandon Z Willis
(74) *Attorney, Agent, or Firm* — Lee & Hayes, P.C.

(57) ABSTRACT

Techniques and methods for performing collision monitoring using system data. For instance, a vehicle may generate sensor data using one or more sensors. The vehicle may then analyze the sensor data using systems in order to determine parameters associated with the vehicle and parameters associated with another object. Additionally, the vehicle may determine uncertainties associated with the parameters and then process the parameters using the uncertainties. Based at least in part on the processing, the vehicle may determine a distribution of estimated locations associated with the vehicle and a distribution of estimated locations associated with the object. Using the distributions of estimated locations, the vehicle may determine the probability of collision between the vehicle and the object.

20 Claims, 15 Drawing Sheets

(51) Int. Cl.
*G08G 1/16* (2006.01)
*G06V 20/58* (2022.01)

(52) U.S. Cl.
CPC ......... *G08G 1/166* (2013.01); *B60W 2554/00* (2020.02); *B60W 2554/80* (2020.02); *B60W 2555/20* (2020.02)

(58) Field of Classification Search
CPC .. B60W 40/02; B60W 40/04; B60W 50/0097; B60W 60/0015; B60W 60/001; B60W 2554/00; B60W 2554/40; B60W 2554/4049; B60W 2554/80; B60W 2555/20; B60W 2720/10; B60W 2720/24; G08G 1/16; G08G 1/166; G06K 9/00624; G06K 9/00791; G06K 9/00825; G06K 9/00805
See application file for complete search history.

(56) References Cited

U.S. PATENT DOCUMENTS

| | | | |
|---|---|---|---|
| 9,849,876 B2* | 12/2017 | Morales Teraoka | B60W 30/0956 |
| 10,011,276 B2* | 7/2018 | Obata | B60W 30/18163 |
| 10,029,682 B2 | 7/2018 | Gunaratne | |
| 10,611,367 B2* | 4/2020 | Minemura | B60W 30/0956 |
| 10,741,079 B2* | 8/2020 | Takabayashi | G08G 1/133 |
| 2017/0132334 A1* | 5/2017 | Levinson | G01S 17/931 |
| 2020/0023836 A1* | 1/2020 | Schneider | B60W 50/0097 |
| 2021/0139023 A1 | 5/2021 | Crego et al. | |

OTHER PUBLICATIONS

The PCT Search Report and Written Opinion dated Feb. 4, 2021 for PCT application No. PCT/US20/60197, 9 pages.
Office Action from U.S. Appl. No. 16/682,971, dated Sep. 27, 2021, Crego, "Collision Monitoring Using Statistic Models ", 26 Pages.
Office Action for U.S. Appl. No. 16/682,971, dated Mar. 14, 2022, Crego, "Collision Monitoring Using Statistic Models ", 25 pages.
Office Action for U.S. Appl. No. 16/682,971, dated Jul. 28, 2022, Crego, "Collision Monitoring Using Statistic Models ", 26 Pages.
The International Preliminary Report on Patentability for PCT Application No. PCT/US20/60197, dated May 27, 2022, 7 pages.

* cited by examiner

COLLISION MONITORING USING SYSTEM DATA

BACKGROUND

An autonomous vehicle can use an autonomous vehicle controller to guide the autonomous vehicle through an environment. For example, the autonomous vehicle controller can use planning methods, apparatuses, and systems to determine a drive path and guide the autonomous vehicle through the environment that contains dynamic objects (e.g., vehicles, pedestrians, animals, and the like) and static objects (e.g., buildings, signage, stalled vehicles, and the like). The autonomous vehicle controller ma take into account predicted behavior of the dynamic objects as the vehicle navigates through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
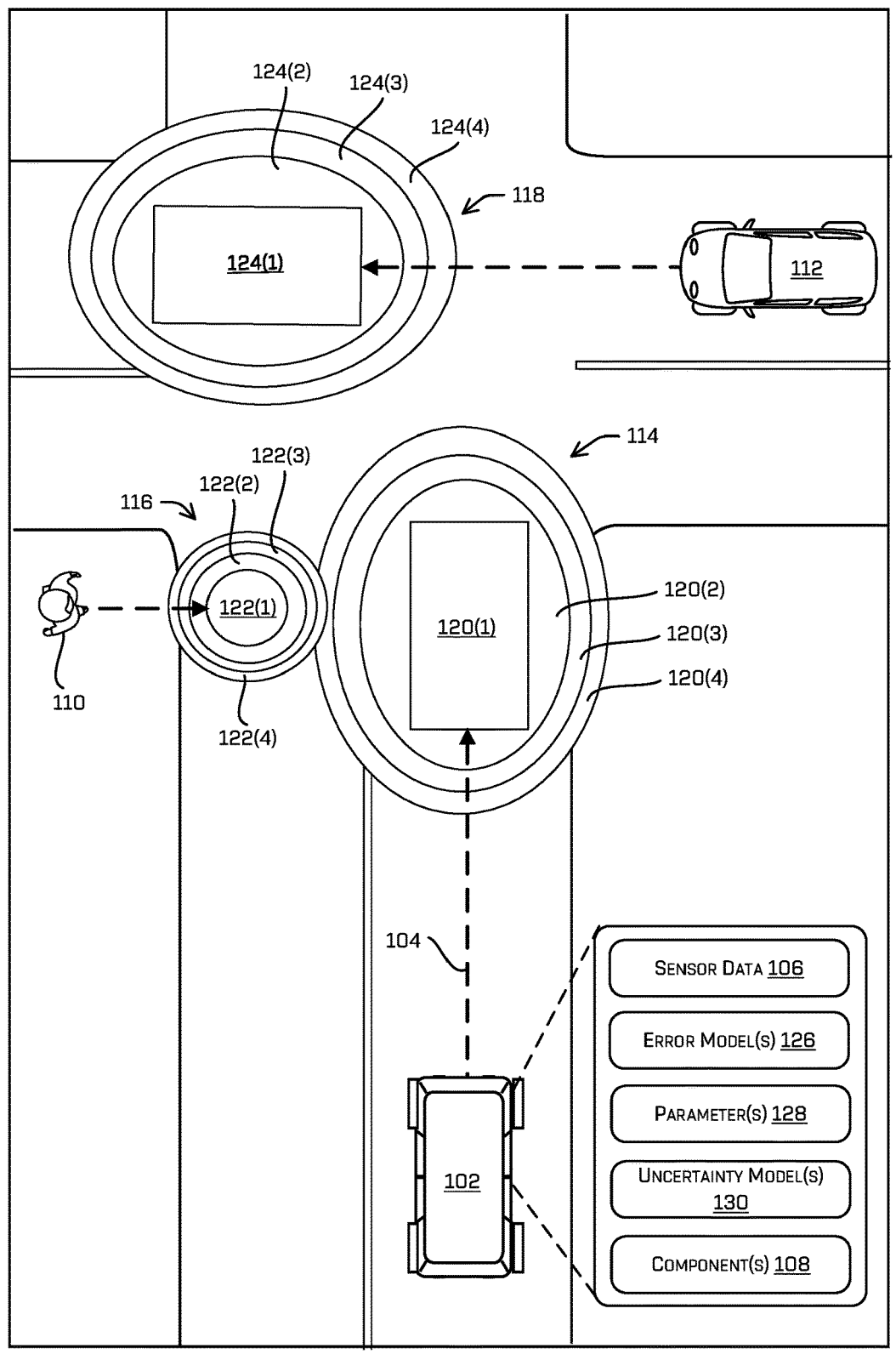
FIG. 1 is an illustration of an environment that includes a vehicle performing collision monitoring using error models and/or system data, in accordance with embodiments of the disclosure.

As discussed above, an autonomous vehicle can use a controller to guide the autonomous vehicle through an environment. For example, the controller can use planning methods, apparatuses, and systems to determine a drive path and guide the autonomous vehicle through the environment that contains dynamic objects (e.g., vehicles, pedestrians, animals, and the like) and/or static objects (e.g., buildings, signage, stalled vehicles, and the like). In order to ensure the safety of the occupants and objects, the autonomous vehicle controller may employ safety factors when operating in the environment. In at least some examples, however, such systems and controllers may comprise complex systems which are incapable of being inspected. Despite the fact that there may not be methods for determining errors or uncertainties associated with such systems and controllers, such errors and uncertainties may be necessary for informing such a vehicle of safe operation in an environment.

As such, this disclosure is directed to techniques for performing collision monitoring using error models and/or system data by determining such error and/or uncertainty models for complex systems and controllers. For example, an autonomous vehicle may use error models and/or system uncertainties to determine, at a later time, estimated locations of both the autonomous vehicle and one or more objects. In some instances, the estimated locations may include distributions of probability locations associated with the autonomous vehicle and the one or more objects. The autonomous vehicle may then determine a probability of collision between the autonomous vehicle and the one or more objects using the estimated locations. Based at least in part on the probability of collision, the autonomous vehicle may perform one or more actions. In at least some examples, such probabilities may be determined based on determinations made according to any of the techniques described in detail herein.

For more details, the autonomous vehicle can traverse an environment and generate sensor data using one or more sensors. In some instances, the sensor data can include data captured by sensors such as time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The autonomous vehicle can then analyze the sensor data using one or more components (e.g., one or more systems) when navigating through the environment.

For example, the one or more of the components of the autonomous vehicle can use the sensor data to generate a trajectory for the autonomous vehicle. In some instances, the one or more components can also use the sensor data to determine pose data associated with a position of the autonomous vehicle. For example, the one or more components can use the sensor data to determine position data, coordinate data, and/or orientation data of the vehicle in the environment. In some instances, the pose data can include x-y-z coordinates and/or can include pitch, roll, and yaw data associated with the vehicle.

Additionally, the one or more component of the autonomous vehicle can use the sensor data to perform operations such as detecting, identifying, segmenting, classifying, and/or tracking objects within the environment. For example, objects such as pedestrians, bicycles/bicyclists, motorcycles/motorcyclists, buses, streetcars, trucks, animals, and/or the like can be present in the environment. The one or more components can use the sensor data to determine current locations of the objects as well as estimated locations for the objects at future times (e.g., one second in the future, five seconds in the future, etc.).

The autonomous vehicle can then use the trajectory of the autonomous vehicle along with the estimated locations of the objects to determine a probability of collision between the autonomous vehicle and the objects. For example, the autonomous vehicle may determine if an estimated location of an object at a future time intersects with a location of the autonomous vehicle along the trajectory at the future time. To increase the safety, the autonomous vehicle may use distance and/or time buffers when making the determination. For example, the autonomous vehicle may determine that there is a high probability of collision when the location of the object at the future time is within a threshold distance (e.g., a distance buffer) to the location of the autonomous vehicle.

Additionally, the autonomous vehicle may use error models associated with the components and/or uncertainties associated with the outputs of the components to determine the probability of collision. An error model associated with a component can represent error(s) and/or error percentages associated with the output of the component. For example, a perception error model can produce a perception error associated with a perception parameter (e.g., an output) of a perception component, a prediction error model can produce a prediction error associated with a prediction parameter (e.g., an output) from a prediction component, and/or the like. In some instances, the errors may be represented by, and without limitation, look-up tables determined based at least in part on statistical aggregation using ground-truth data, functions (e.g., errors based on input parameters), or any other model or data structure which maps an output to a particular error. In at least some examples, such error models may map particular errors with probabilities/frequencies of occurrence. As will be described, in some examples, such error models may be determined for certain classes of data (e.g., differing error models for a perception system for detections within a first range and for detections within a second range of distances, based on a velocity of the vehicle, of the object, etc.).

In some instances, the error models may include static error models. In other instances, the error models may include dynamic error models which are updated by the autonomous vehicle and/or one or more computing devices. For instance, the computing device(s) may continue to receive vehicle data from autonomous vehicles. The computing device(s) may then update the error models using the vehicle data as well as ground truth data, which is described in more detail below. After updating the error models, the computing device(s) may send the updated error models to the autonomous vehicle.

A component may analyze sensor data and, based at least in part on the analysis, produce an output, which may represent one or more parameters. An error model can then indicate that an output of the component of the vehicle, such as a speed associated with an object, is associated with an error percentage. For instance, the component may determine that the speed of the object within the environment is 10 meters per second. Using the error model, the autonomous vehicle may determine that the error percentage is X % (e.g., 20%) resulting in a range of speeds +/−X % (e.g., between 8 meters per second and 12 meters per second in the case of a 20% error percentage). In some instances, the range of speeds can be associated with a probability distribution, such as a Gaussian distribution, indicating that portions of the range have a higher probability of occurring than other portions of the range. In some examples, the probability distribution may be binned into multiple discrete probabilities. For example, 8 meters per second and 12 meters per second may be associated with a 5% probability, 9 meters per second and 11 meters per second may be associated with a 20% percent probability, and 10 meters per second may be associated with a 45% probability.

To use the error models, the autonomous vehicle may determine estimated locations of an object at a future time based at least in part on the outputs from the components and the error models associated with the components. The estimated locations may correspond to a probability distribution, such as a Gaussian distribution, of locations. In some instances, the autonomous vehicle determines the estimated locations of the object by initially determining the respective probability distributions associated with each of the components and/or the parameters. The autonomous vehicle may then determine the estimated locations using the probability distributions for all of the components and/or parameters. For example, the autonomous vehicle may aggregate or combine the probability distributions for all of the components and/or parameters to determine the estimated locations. Aggregating and/or combining the probability distributions may include multiplying the probability distributions, summing up the probability distributions, and/or applying one or more other formulas to the probability distributions.

Additionally, or alternatively, in some instances, the autonomous vehicle may first determine an initial estimated location associated with the object using the outputs from the components. The autonomous vehicle then uses the error models to determine total errors of each of the outputs. The autonomous vehicle may determine the total errors by aggregating and/or combining the errors from each of the error models for the components. Next, the autonomous vehicle uses the total errors and initial estimated location to determine the estimated locations. In such instances, the estimated locations may include a distribution of probable locations around the initial estimated location.

For a first example, the autonomous vehicle may use one or more components to analyze the sensor data in order to determine parameters associated with an object. The parameters may include, but are not limited to, a type of object, a current location of the object, a speed of the object, a direction of travel of the object, and/or the like. Using the error models, the autonomous vehicle may then determine a probability distribution associated with the type of object, a probability distribution associated with the current location of the object, a probability distribution associated with the speed of the object, a probability distribution associated with the direction of travel of the object, and/or the like. The autonomous vehicle may then determine the estimated locations of the object at the future time using the probability distributions for the parameters. In this first example, each (or any one or more) of the estimated locations may be represented as a probability distribution of locations.

For a second example, the autonomous vehicle may use the one or more components to analyze the sensor data in order to once again determine the parameters associated with the object. The autonomous vehicle may then determine an initial estimated location of the object at the future time using the parameters. Additionally, in some examples, the autonomous vehicle may use the error models associated with the parameters to determine total errors and/or error percentages associated with determining the initial estimated location of the object. The autonomous vehicle may then use the initial estimated location and the total errors and/or error percentages to determine the estimated locations for the object. Again, in this second example, each (or any one or more) of the estimated locations may be represented as a probability distribution of locations.

In either of the examples above, the autonomous vehicle may use similar processes to determine estimated locations of one or more other objects located within the environment. Additionally, the autonomous vehicle may use similar processes to determine estimated locations of the autonomous vehicle at the future time. For example, the autonomous vehicle may use one or more components to analyze the sensor data in order to determine parameters associated with the autonomous vehicle. The parameters may include, but are not limited to, a location of the autonomous vehicle, a speed of the autonomous vehicle, a direction of travel of the autonomous vehicle, and/or the like. The autonomous vehicle may then employ error models associated with the parameters to determine estimated locations of the autonomous vehicle at the future time. In some examples, each (or any one or more) of the estimated locations may correspond to a probability distribution of locations for the autonomous vehicle at the future time.

Additionally to, or alternatively from, using the error models to determine the estimated locations of the autonomous vehicle and/or objects, the autonomous vehicle may use system data, such as uncertainty models, associated with the components and/or the outputs to determine the estimated locations. An uncertainty model associated with a parameter may correspond to a distribution of how much the output should be trusted and/or a measure of how correct the system believes the output to be. For example, if a component analyzes sensor data multiple times in order to determine a location of an object, the component will output a low uncertainty if the outputs include a small distribution of values (e.g., within a first range) around the location indicated by the ground truth data. Additionally, the component will output a large uncertainty if the outputs include a large distribution of values around the location indicated by the ground truth data (e.g., within a second range that is greater than the first range). The autonomous vehicle may use the uncertainty models to determine estimated locations of an object at a future time.

For a first example, the autonomous vehicle may use one or more components to analyze the sensor data in order to again determine the parameters associated with an object. The autonomous vehicle may then determine an uncertainty model associated with determining the type of object, an uncertainty model associated with determining the current location of the object, an uncertainty model associated with determining the speed of the object, an uncertainty model associated with determining the direction of travel of the object, and/or the like. The autonomous vehicle may then determine the estimated locations of the object at a future time using the uncertainty models associated with the parameters. In this first example, the estimated locations may correspond to a probability distribution of locations.

For a second example, the autonomous vehicle may use the one or more components to analyze the sensor data in order to once again determine the parameters associated with the object. The autonomous vehicle may then determine an initial estimated location of the object at the future time using the parameters. Additionally, the autonomous vehicle may use the uncertainty models associated with the components determining the parameters and the estimated location to determine the estimated locations of the object at the future time. Again, in this second example, the estimated locations may correspond to a probability distribution of locations.

In either of the examples above, the autonomous vehicle may use similar processes to determine estimated locations of one or more other objects located within the environment. Additionally, the autonomous vehicle may use similar processes to determine estimated locations of the autonomous vehicle at the future time. For example, the autonomous vehicle may use one or more components to analyze the sensor data in order to determine parameters associated with the autonomous vehicle. The parameters may include, but are not limited to, a location of the autonomous vehicle, a speed of the autonomous vehicle, a direction of travel of the autonomous vehicle, and/or the like (any and/or all of which may be derived from an output trajectory from a planner system, for example). The autonomous vehicle may then use uncertainty models associated with determining the parameters to determine estimated locations of the autonomous vehicle at the future time. In some examples, the estimated locations may correspond to a probability distribution of locations for the autonomous vehicle at the future time.

In some instances, the autonomous vehicle may then determine a probability of collision using the estimated locations of the autonomous vehicle and the estimated locations of the objects. For example, the probability of collision between the autonomous vehicle and an object may be computed using an area of geometric overlap between the estimated locations (e.g., the probability distribution of locations) of the of the autonomous vehicle and the estimated locations (e.g., the probability distribution of locations) of the object. In some instances, if there are multiple objects located within the environment, the autonomous vehicle may determine a total probability of collision associated with the autonomous vehicle using the determined probability of collisions for each of the objects. For example, the total probability of collision may include the sum of the probability of collisions for each of the objects.

The autonomous vehicle may then determine whether the probability of collision is equal to or greater than a threshold (e.g., 0.5%, 1%, 5%, and/or some other threshold percentage). In some instances, if the probability of collision is less than the threshold, then the autonomous vehicle may continue to navigate along the current route of the autonomous vehicle. However, in some instances, if the autonomous vehicle determines that the probability of collision is equal to or greater than the threshold, then the autonomous vehicle may take one or more actions. For example, the autonomous vehicle may change a speed (e.g., slowdown) of the autonomous vehicle, change the route of the autonomous vehicle, park at a safe location, and/or the like.

Additionally, or alternatively, in some instances, the autonomous vehicle may determine a total uncertainty associated with navigating the autonomous vehicle based at least in part on the uncertainty models used to determine the estimated locations of the autonomous vehicle and the uncertainty models used to determine the estimated locations of the object(s). The autonomous vehicle may then generate different routes and perform similar processes for determining the total uncertainties associated with the different routes. Additionally, the autonomous vehicle may select the route that includes the lowest uncertainty.

In some instances, the autonomous vehicle and/or one or more computing devices use input data (e.g., log data and/or simulation data) to generate the error models and/or the uncertainty models. For example, the autonomous vehicle and/or the one or more computing devices may compare the input data to ground truth data. In some instances, the ground truth data can be manually labeled and/or determined from other, validated, machine-learned components. For example, the input data can include the sensor data and/or the output data generated by a component of the autonomous vehicle. The autonomous vehicle and/or the one or more computing devices can compare the input data with the ground truth data which can indicate the actual parameters of an object in the environment. By comparing the input data with the ground truth data, the autonomous vehicle and/or the one or more computing devices can determine an error and/or uncertainty associated with a component and/or parameter and generate the corresponding error model using the error and/or the corresponding uncertainty models using the uncertainty.

In some instances, the autonomous vehicle and/or the one or more computing devices can determine the uncertainties associated with the components. For example, the autonomous vehicle and/or the one or more computing devices may input the input data into a component multiple times in order to receive multiple outputs (e.g., parameters) from the component. The autonomous vehicle and/or the one or more computing devices may then analyze the outputs to determine a distribution associated with the outputs. Using the distribution, the autonomous vehicle and/or the one or more computing devices may determine the uncertainty. For example, if there is a large distribution, then the autonomous vehicle and/or the one or more computing devices may determine there is a large uncertainty. However, if there is a small distribution, then the autonomous vehicle and/or the one or more computing devices may determine that there is a small uncertainty.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an environment 100 that includes a vehicle 102 performing collision monitoring using error models and/or system data, in accordance with embodiments of the disclosure. For example, the vehicle 102 may be navigating along a trajectory 104 within the environment 100. While navigating, the vehicle 102 may be generating sensor data 106 using one or more sensors of the vehicle 102 and analyzing the sensor data 106 using one or more components 108 (e.g., one or more systems) of the vehicle 102. The component(s) 108 may include, but are not limited to, a localization component, a perception component, a prediction component, a planning component, and/or the like. Based at least in part on the analysis, the vehicle 102 may identify at least a first object 110 and a second object 112 located within the environment 100.

Additionally, the vehicle 102 may analyze the sensor data 106 using the component(s) 108 in order to determine estimated locations 114 associated with the vehicle 102, estimated locations 116 associated with the first object 110, and estimated locations 118 associated with the second object 112 at a future time. In some instances, the estimated locations 114 may include a probability distribution of locations associated with the vehicle 102, the estimated locations 116 may include a probability distribution of locations associated with the first object 110, and/or the estimated locations 118 may include a probability distribution of locations associated with the second object 112.

For example, the estimated locations 114 may include an estimated location 120(1) associated with the vehicle 102, a first area of estimated locations 120(2) (e.g., a first boundary) that are associated with a first probability, a second area of estimated locations 120(3) (e.g., a second boundary) that are associated with a second probability, and a third area of estimated locations 120(4) (e.g., a third boundary) that are associated with a third probability. In some instances, the first probability is greater than the second probability and the second probability is greater than the third probability. For example, the vehicle 102 may determine that there is a higher probability that the vehicle 102 will be located within the first area of estimated locations 120(2) than within the second area of probably location 120(3). Additionally, the vehicle 102 may determine that there is a higher probability that the vehicle 102 will be located within the second area of estimated location 120(3) than within the third area of estimated locations 120(4).

It should be noted that, while the example of FIG. 1 only illustrates three separate areas so estimated locations, in other examples, there may be any number of areas of estimated locations. Additionally, the areas that are located further from the estimated location 120(1) may include a lower probability than the areas that are located closer to the estimated location 120(1). This may similarly be for each of the estimated locations of the object 110 and the object 112.

Additionally, the estimated locations 116 may include an estimated location 122(1) associated with the first object 110, a first area (e.g., a first boundary) of estimated locations 122(2) that are associated with a first probability, a second area of estimated locations 122(3) (e.g., a second boundary) that are associated with a second probability, and a third area of estimated locations 122(4) (e.g., a third boundary) that are associated with a third probability. In some instances, the first probability is greater than the second probability and the second probability is greater than the third probability. For example, the vehicle 102 may determine that there is a higher probability that the first object 110 will be located within the first area of estimated locations 122(2) than within the second area of probably location 122(3). Additionally, the vehicle 102 may determine that there is a higher probability that the first object 110 will be located within the second area of estimated location 122(3) than within the third area of estimated locations 122(4).

Furthermore, the estimated locations 118 may include an estimated location 124(1) associated with the second object 112, a first area of estimated locations 124(2) (e.g., a first boundary) that are associated with a first probability, a second area of estimated locations 124(3) (e.g., a second boundary) that are associated with a second probability, and a third area of estimated locations 124(4) (e.g., a third boundary) that are associated with a third probability. In some instances, the first probability is greater than the second probability and the second probability is greater than the third probability. For example, the vehicle 102 may determine that there is a higher probability that the second object 112 will be located within the first area of estimated locations 124(2) than within the second area of probably location 124(3). Additionally, the vehicle 102 may determine that there is a higher probability that the second object 112 will be located within the second area of estimated location 124(3) than within the third area of estimated locations 124(4).

In some instances, the vehicle 102 may determine the estimated locations 114-118 using error model(s) 126 associated with the component(s) 108. For example, and for the first object 110, the vehicle 102 may analyze the sensor data 106 using the component(s) 108 in order to determine one or more parameters 128 associated with the first object 110. The parameter(s) 128 may include, but are not limited to, a type of the first object 110, a current location of the first object 110 (and/or distance to the first object 110), a speed of the first object 110, and/or the like. Using the error model(s) 126, the vehicle 102 may then determine the estimated locations 116 of the first object 110.

For a first example, the vehicle 102 may use a first error model 126 to determine a probability distribution associated with the type of the first object 110, use a second error model 126 to determine a probability distribution associated with the current location of the first object 110, use a third error model 126 to determine a probability distribution associated with the speed of the first object 110, and/or the like. For instance, and using the speed of the first object 110, the vehicle 102 may determine that the speed of the first object 110 is 1 meter per second. The vehicle 102 may then use the third error model 126 to determine that the error percentage can be X % (e.g., 20%) resulting in a range of speeds (e.g., speeds between 0.8 meters per second and 1.2 meters per second at 20%). In some instances, the error model 126 may further indicate that portions of the range have a higher probability of occurring than other portions of the range. For example, 0.8 meters per second and 1.2 meters per second may be associated with a 5% probability, 0.9 meters per second and 1.1 meters per second may be associated with a 20% percent probability, and 1 meter per second may be associated with a 45% probability. The vehicle 102 may use similar processes for determining the probability distributions of the other parameter(s) 128.

The vehicle 102 may then use the probability distributions of the parameters 128 to determine the estimated locations 116 of the first object 110. Additionally, the vehicle 102 may use similar processes to determine parameters 128 for the vehicle 102, determine the probability distributions associated with the parameters 128 for the vehicle 102, and determine the estimated locations 114 using the probability distributions. Furthermore, the vehicle 102 may use similar processes to determine parameters 128 for the second object 112, determine the probability distributions associated with the parameters 128 for the second object 112, and determine the estimated locations 116 using the probability distributions.

For a second example, the vehicle 102 may use the parameters 128 for the first object 110 in order to determine the estimated location 122(1) for the first object 110. The vehicle 102 may then use the error models 126 associated with the parameters 128 that were used to determine the estimated location 122(1) in order to determine total errors for the parameters 128. Using the total errors and the estimated location 122(1), the vehicle 102 may determine the estimated locations 116 for the first object 110. Additionally, the vehicle 102 may use similar processes to determine the estimated locations 114 for the vehicle 102 and the estimated locations 118 for the second object 112.

Additionally to, or alternatively from, using the error model(s) 126 to determine the estimated locations 114-118, in other examples, the vehicle 102 may use one or more uncertainty model(s) 130 associated with the component(s) 108 and/or the parameter(s) 128. For instance, the outputs from the component(s) 108 may include uncertainty model(s) 130 associated with determining the parameters 128. For instance, the vehicle 102 may determine a first uncertainty model 130 associated with determining the type of the first object 110, a second uncertainty model 130 associated with determining the current location of the first object 110, a third uncertainty model 130 associated with determining the speed of the first object 110, and/or the like. The vehicle 102 may then determine the estimated locations 116 for the first object 110 using the parameters 128 and the uncertainty models 130.

For a first example, the vehicle 102 may use the first uncertainty model 130 to determine a probability distribution associated with the type of the first object 110, use the second uncertainty model 130 to determine a probability distribution associated with the current location of the first object 110, use the third uncertainty model 130 to determine a probability distribution associated with the speed of the first object 110, and/or the like. For instance, and using the speed of the first object 110, the vehicle 102 may determine that the speed of the first object 110 is 1 meter per second. The vehicle 102 may then determine that the uncertainty for the speed of the first object is 20% and as such, the certainty is 80%. As such, the vehicle 102 may determine that the range for the speed is between 0.8 meters per second and 1.2 meters per second. In some instances, the vehicle 102 may further determine that portions of the range have a higher probability of occurring than other portions of the range. For example, 0.8 meters per second and 1.2 meters per second may be associated with a 5% probability, 0.9 meters per second and 1.1 meters per second may be associated with a 20% percent probability, and 1 meter per second may be associated with a 45% probability. The vehicle 102 may use similar processes for determining the probability distributions of the other parameter(s) 128.

The vehicle 102 may then use the probability distributions of the parameters 128 to determine the estimated locations 116 of the first object 110. Additionally, the vehicle 102 may use similar processes to determine parameters 128 for the vehicle 102, determine the probability distributions associated with the parameters 128 for the vehicle 102, and determine the estimated locations 114 using the probability distributions. Furthermore, the vehicle 102 may use similar processes to determine parameters 128 for the second object 112, determine the probability distributions associated with the parameters 128 for the second object 112, and determine the estimated locations 116 using the probability distributions.

For a second example, the vehicle 102 may use the parameters 128 for the first object 110 in order to determine the estimated location 122(1) for the first object 110. The vehicle 102 may then use the uncertainty model(s) 130 associated with the parameters 128 in order to determine a total uncertainty associated with the estimated location 122(1). Using the total uncertainty, the vehicle 102 may determine the estimated locations 116 for the first object 110. Additionally, the vehicle 102 may use similar processes to determine the estimated locations 114 for the vehicle 102 and the estimated locations 118 for the second object 112.

In either of the examples above, after determining the estimated locations 114-118, the vehicle 102 may determine a probability of collision using the estimated locations 114-118. For example, the vehicle 102 may determine the probability of collision between the vehicle 102 and the first object 110. In some instances, the vehicle 102 may determine the probability of collision using at least an area of geometric overlap between the estimated locations 114 of the vehicle 102 and the estimated locations 116 of the first object 110.

More specifically, the estimated locations 114 of the vehicle 102 may be Gaussian with parameters $\mu_v, \sigma_v$ (which may be represented by $N(\mu_v, \sigma_v^2)$). Additionally, the estimated locations 116 of the first object 110 may be Gaussian with parameters $\mu_0, \sigma_0$ (which may be represented by $N(\mu_0, \sigma_0^2)$). The probability of overlap between the estimated locations 114 and the estimated locations 116 may then translate to $P[x=0]$, where x belongs to $N(\mu_v-\mu_0, \sigma_0^2+\sigma_v^2)$. This may represent a one-dimensional problem associated with determining the probability of overlap.

In some instances, the vehicle 102 may perform similar processes in order to extend the one-dimensional problem to a two-dimensional problem. Additionally, the vehicle 102 may perform similar processes in order to determine the probability of collision between the vehicle 102 and the second object 112. In some instances, the vehicle 102 may then determine a total probability of collision using the probability of collision between the vehicle 102 and the first object 110 and the probability of collision between the vehicle 102 and the second object 112. However, in the example of FIG. 1, the probability of collision between the vehicle 102 and the second object 112 may be zero since there is no geometric overlap between the estimated locations 114 and the estimated locations 118.

The vehicle 102 may then determine if the probability of collision is equal to or greater than a threshold. Based at least in part on determining that the probability of collision is less than the threshold, the vehicle 102 may continue to navigate along the trajectory 104. However, based at least in part on determining that the probability of collision is equal to or greater than the threshold, the vehicle 102 may take one or more actions. The one or more actions may include, but are not limited to, navigating along a new trajectory, changing a speed (e.g., slowing down), parking, and/or the like.

It should be noted that, in some examples, the vehicle 102 may perform similar processes in order to determine a probability of collision between the object 110 and the object 112. The vehicle 102 may then perform one or more actions based at least in part on the probability of collision. For instance, if the vehicle 102 determines that the probability of collision between the object 110 and the object 112 is equal to or greater than a threshold, the vehicle 102 may stop.

Figure 2:
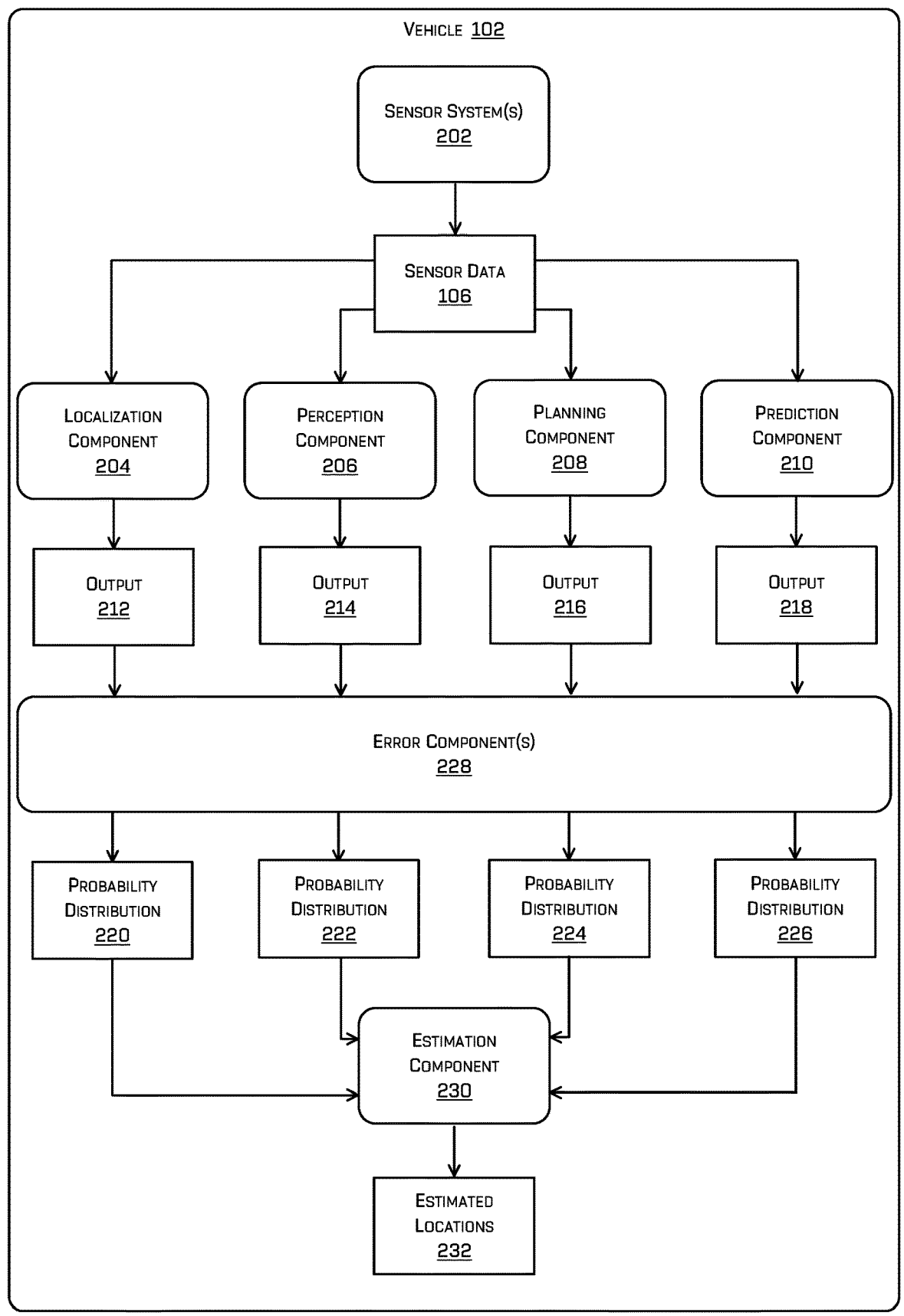
FIG. 2 is an illustration of an example of a vehicle analyzing sensor data using error models in order to determine estimated locations associated with an object, in accordance with embodiments of the disclosure.

FIG. 2 is an illustration of an example of the vehicle 102 analyzing the sensor data 106 using the error model(s) 126 in order to determine estimated locations associated with an object, in accordance with embodiments of the disclosure. For instance, sensor system(s) 202 of the vehicle 102 may generate the sensor data 106. The sensor data 106 may then be analyzed by the component(s) 108 of the vehicle 102. In the example of FIG. 2, the component(s) 108 may include a localization component 204, a perception component 206, a planning component 208, and a prediction component 210. However, in other examples, the vehicle 102 may not include one or more of the localization component 204, the perception component 206, the planning component 208, or the prediction component 210. Additionally, or alternatively, in some examples, the vehicle 102 may include one or more additional components.

One or more of the components 204-210 may then analyze the sensor data 106 and generate outputs 212-218 based at least in part on the analysis. In some instances, the outputs 212-218 may include parameters associated with the vehicle 102 and/or objects. For a first example, the output 212 from the localization component 204 may indicate the position of the vehicle 102. For a second example, the output 214 from the perception component 206 may include detection, segmentation, classification, and/or the like associated with objects. For a third example, the output 216 from the planning component 208 may include a path for the vehicle 102 to traverse within the environment.

It should be noted that, while not illustrated in the example of FIG. 2, one or more of the components 204-210 may use outputs 212-218 from one or more of the other components 204-210 in order to generate an output 212-218. For example, the planning component 208 may use the output 212 from the localization component 204 in order to generate the output 216. For another example, the planning component 208 may use the output 214 from the perception component 206 in order to generate the output 216. Additionally to, or alternatively from, using the outputs 212-218 from one or more other components 204-210, a component 204-210 may use the probability distributions 220-226, which are described below.

Error component(s) 228 may be configured to process the outputs 212-218 using the error model(s) 126 in order to generate the probability distributions 220-226 associated with the outputs 212-218. In some instances, the error component(s) 228 may be included within the components 204-210. For example, the localization component 204 may analyze the sensor data 106 and, based at least in part on the analysis, generate both the output 212 and the probability distribution 220 associated with the output 212. For another example, the perception component 206 may analyze the sensor data 106 and, based at least in part on the analysis, generate both the output 214 and the probability distribution 222 associated with the output 214.

The probability distributions 220-226 may respectfully be associated with the outputs 212-218. For example, the error component(s) 228 may process the output 212 using error model(s) 126 associated with the localization component 204 in order to generate the probability distribution 220. For instance, if the output 212 indicates a location of the vehicle 102, the probability distribution 220 may represent estimated locations of the vehicle 102 that are based on the determined location and error(s) represented by the error model(s) 126 for the localization component 204. Additionally, the error component(s) 228 may process the output 214 using error model(s) 126 associated with the perception component 206 in order to generate the probability distribution 222. For instance, if the output 214 indicates a speed of an object, the probability distribution 222 may represent probable speeds of the object that are based on the determined speed and error(s) represented by the error model(s) 126 for the perception component 206.

An estimation component 230 may be configured to process one or more of the probability distributions 220-226 and/or the sensor data 106 (not illustrated for clarity reasons) in order to generate estimated locations 232 associated with the vehicle 102 and/or objects. As discussed herein, the estimated locations 232 may include a probability distribution, such as a Gaussian distribution, of locations.

Figure 3:
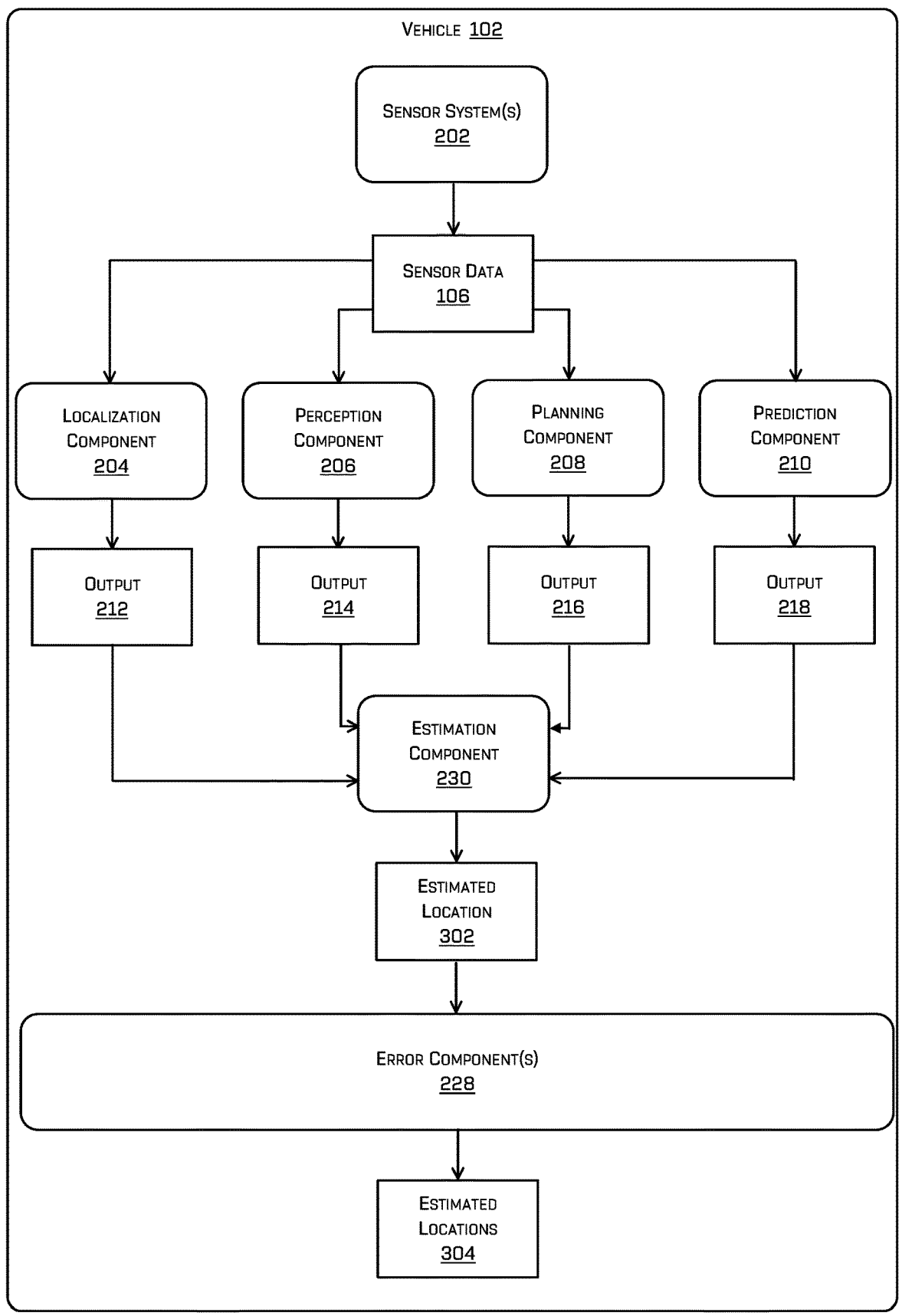
FIG. 3 is an illustration of another example of a vehicle analyzing sensor data using error models in order to determine estimated locations associated with an object, in accordance with embodiments of the disclosure.

FIG. 3 is an illustration of another example of the vehicle 102 analyzing the sensor data 106 using the error model(s) 126 in order to determine estimated locations associated with an object, in accordance with embodiments of the disclosure. In the example of FIG. 3, the estimation component 230 may analyze one or more of the outputs 212-218 from one or more of the components 204-210 in order to determine an estimated location 302 associated with the vehicle 102 and/or an object. The error component(s) 228 may then use the error model(s) 126 and the estimated location 302 to determine the estimated locations 304 of the vehicle 102 and/or the object.

For example, the error component(s) 228 may use the error model(s) 126 to determine total error(s) and/or total error percentages associated with the output(s) 212-218 of the component(s) 204-210 that were used to determine the estimated location 302. The error component(s) 228 may then use the total error(s) and/or total error percentages to generate the estimated locations 304. As discussed herein, the estimated locations 304 may include a probability distribution, such as a Gaussian distribution, of locations.

Figure 4:
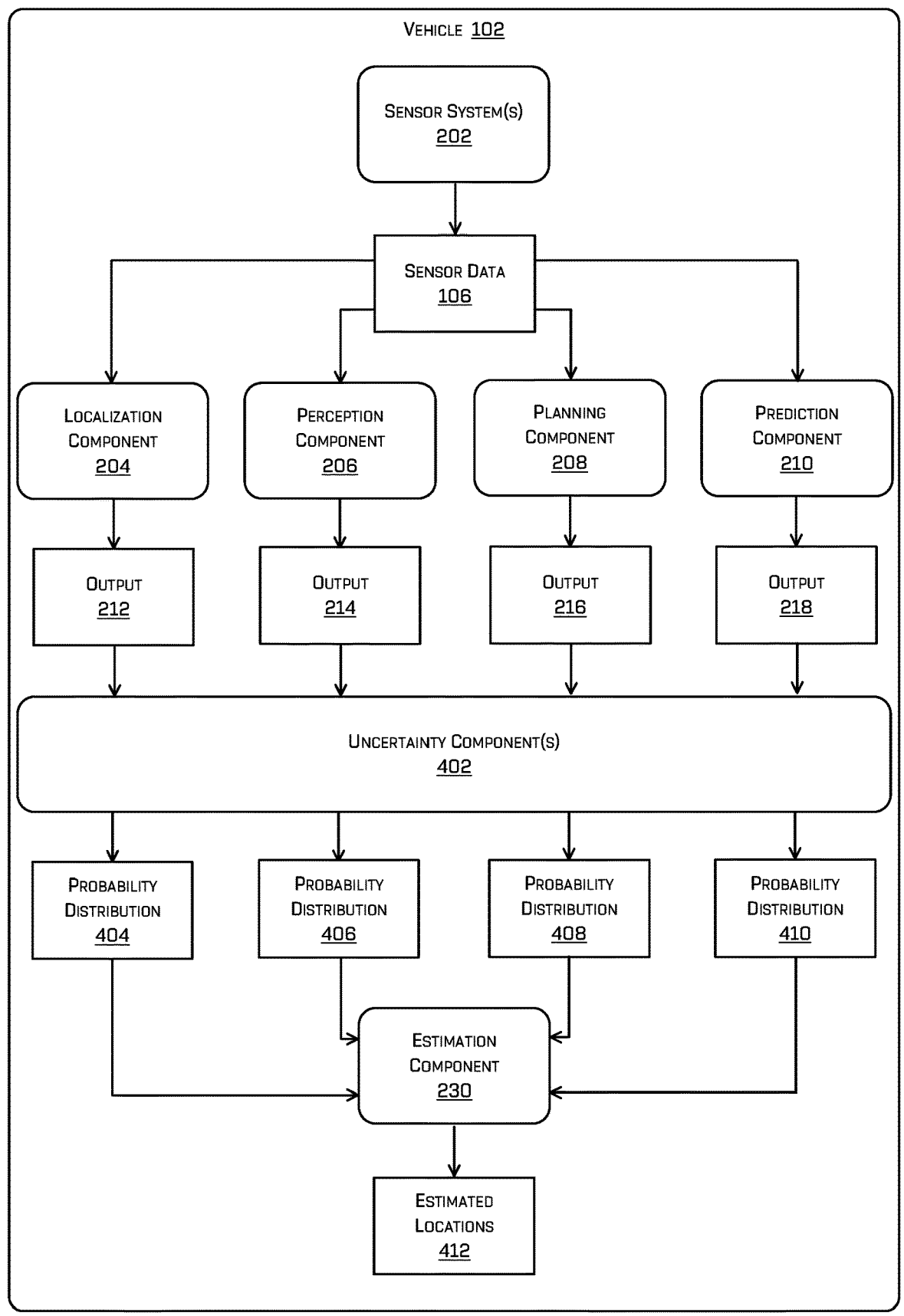
FIG. 4 is an illustration of an example of a vehicle analyzing sensor data and system data in order to determine estimated locations associated with an object, in accordance with embodiments of the disclosure.

FIG. 4 is an illustration of an example of the vehicle 102 analyzing the sensor data 106 using the uncertainty model(s) 130 in order to determine estimated locations associated with an object, in accordance with embodiments of the disclosure. For instance, uncertainty component(s) 402 may be configured to process the outputs 212-218 using the uncertainty model(s) 130 in order to generate probability distributions 404-410 associated with the outputs 212-218. In some instances, the uncertainty component(s) 402 may be included within the components 204-210. For example, the localization component 204 may analyze the sensor data 106 and, based at least in part on the analysis, generate both the output 212 and the probability distribution 404 associated with the output 212. For another example, the perception component 206 may analyze the sensor data 106 and, based at least in part on the analysis, generate both the output 214 and the probability distribution 406 associated with the output 214.

It should be noted that, while not illustrated in the example of FIG. 4, one or more of the components 204-210 may use outputs 212-218 from one or more of the other components 204-210 in order to generate an output 212-218. For example, the planning component 208 may use the output 212 from the localization component 204 in order to generate the output 216. For another example, the planning component 208 may use the output 214 from the perception component 206 in order to generate the output 216. Additionally to, or alternatively from, using the outputs 212-218 from one or more other components 204-210, a component 204-210 may use the probability distributions 404-410.

The probability distributions 404-410 may respectfully be associated with the outputs 212-218. For example, the uncertainty component(s) 402 may process the output 212 using the uncertainty model(s) 130 associated with the localization component 204 in order to generate the probability distribution 404. For instance, if the output 212 indicates a location of the vehicle 102, the probability distribution 404 may represent estimated locations of the vehicle 102 that are based at least in part on the determined location and uncertainty model(s) 130 for the localization component 204. Additionally, the uncertainty component(s) 402 may process the output 214 using uncertainty model(s) 130 associated with the perception component 206 in order to generate the probability distribution 406. For instance, if the output 214 indicates a speed of an object, the probability distribution 406 may represent probable speeds of the object that are based on the determined speed and the uncertainty model(s) 130 for the perception component 206.

A estimation component 230 may be configured to process one or more of the probability distributions 404-410 and/or the sensor data 106 (not illustrated for clarity reasons) in order to generate estimated locations 412 associated with the vehicle 102 and/or the object. As discussed herein, the estimated locations 412 may include a probability distribution, such as a Gaussian distribution, of locations.

Figure 5:
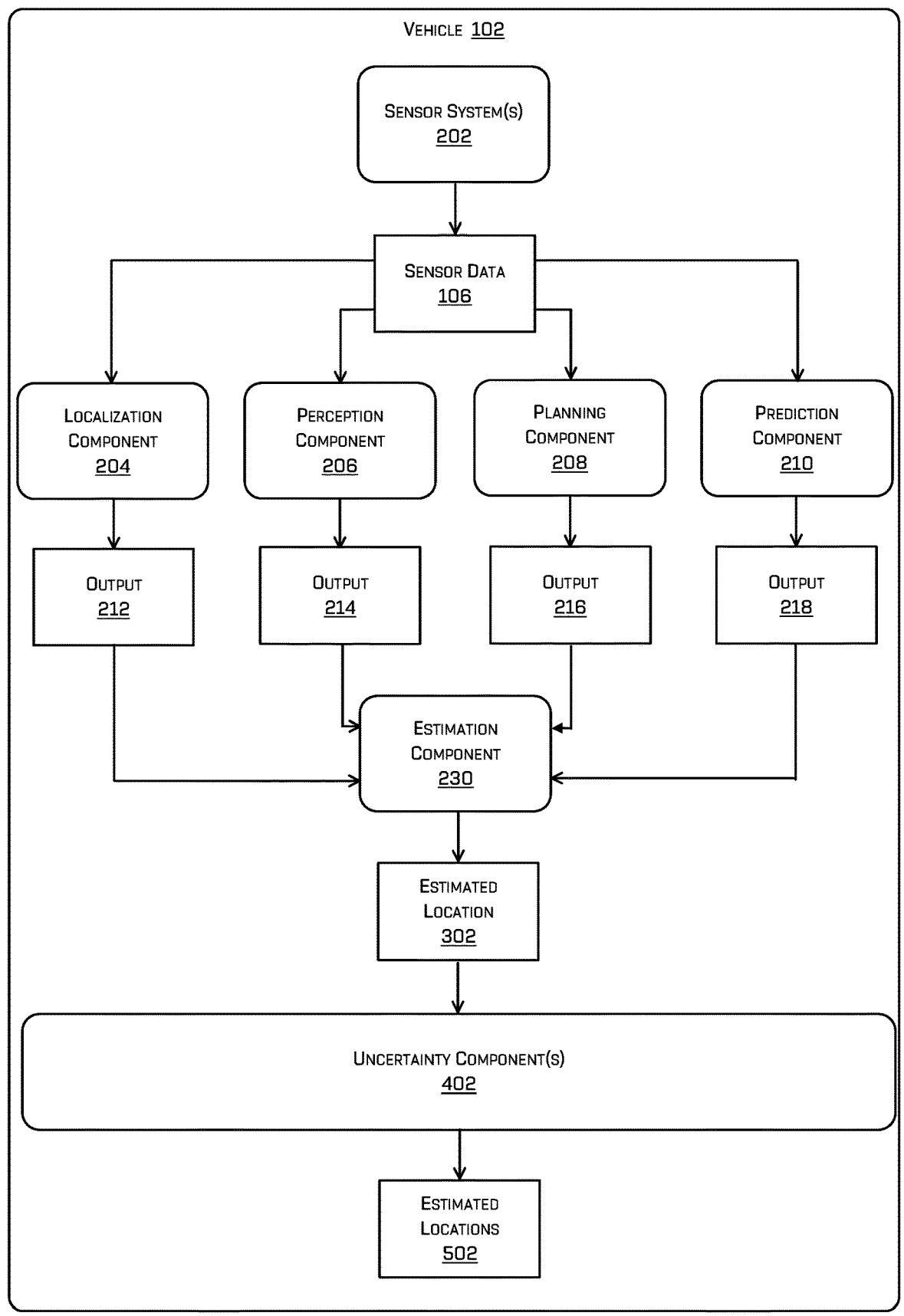
FIG. 5 is an illustration of another example of a vehicle analyzing sensor data and system data in order to determine estimated locations associated with an object, in accordance with embodiments of the disclosure.

FIG. 5 is an illustration of another example of the vehicle 102 analyzing the sensor data 106 using the uncertainty model(s) 130 in order to determine estimated locations associated with an object, in accordance with embodiments of the disclosure. In the example of FIG. 5, the estimation component 230 may analyze one or more of the outputs 212-218 from one or more of the components 204-210 in order to determine the estimated location 302 associated with the vehicle 102 and/or an object. The uncertainty component(s) 402 may then use the uncertainty model(s) 130 and the estimated location 302 to determine the estimated locations 502 of the vehicle 102 and/or the object.

For example, the uncertainty component(s) 402 may use the uncertainty model(s) 130 for the components 204-210 to determine total uncertainties associated with the output(s) 212-218 of the component(s) 204-210 that were used to determine the estimated location 302. The uncertainty component(s) 402 may then use the total uncertainties to generate the estimated locations 502. As discussed herein, the estimated locations 502 may include a probability distribution, such as a Gaussian distribution, of locations.

Figure 6:
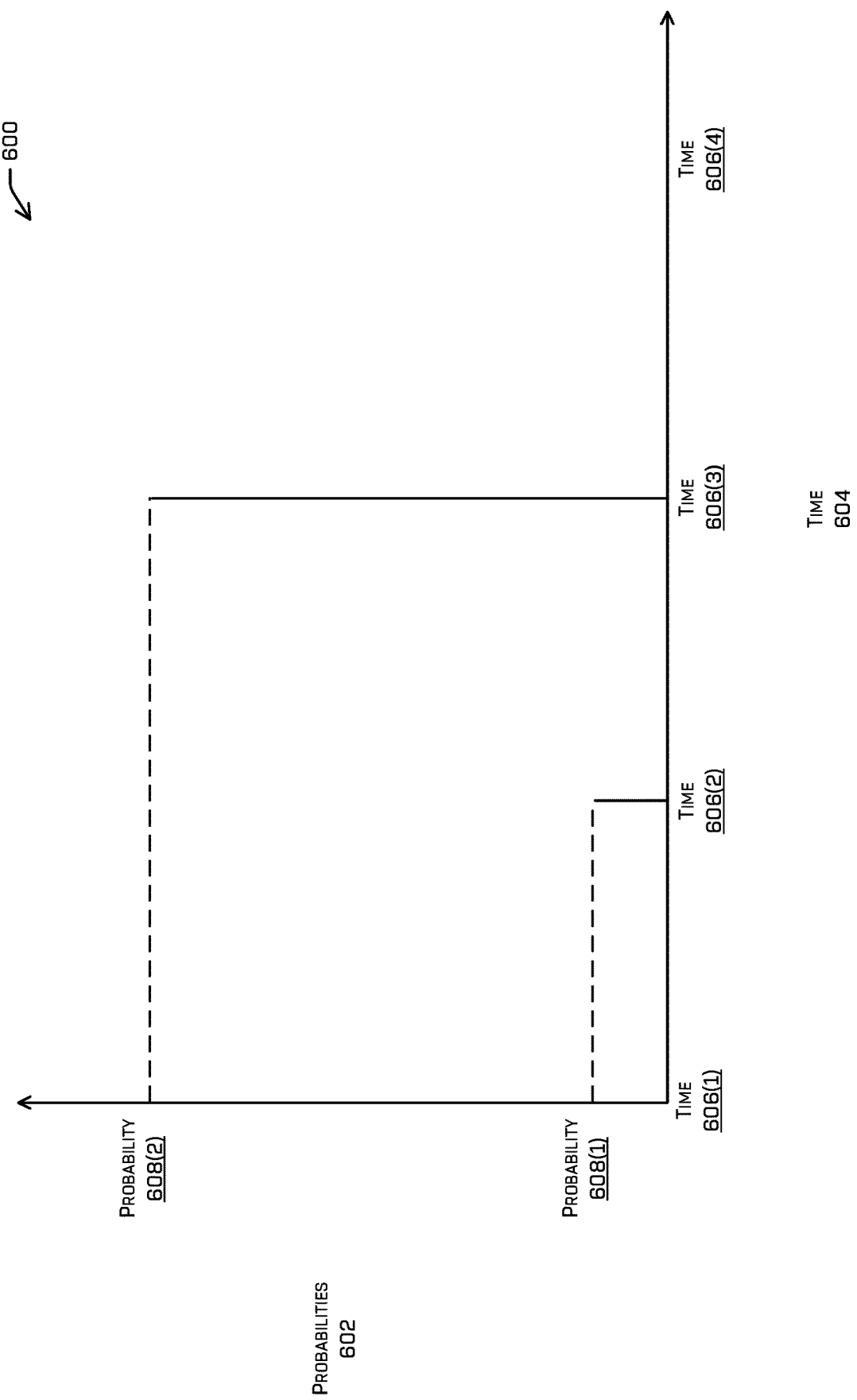
FIG. 6 illustrates an example graph illustrating a vehicle determining probabilities of collision, in accordance with embodiments of the disclosure.

FIG. 6 illustrates an example graph 600 illustrating the vehicle 102 determining probabilities of collision over a period of time, in accordance with embodiments of the disclosure. As shown, the graph 600 represent probabilities 602 along the y-axis and time 604 along the x-axis. In the example of FIG. 6, the vehicle 102 may determine the probabilities of collision at time 606(1). For instance, at time 606(1), the vehicle 102 may determine the probabilities of collision at three future times, time 606(2), time 606(3), and time 606(4). In some instances, the probabilities of collision are associated with the vehicle 102 and a single object. In other instances, the probabilities of collision are associated with the vehicle 102 and more than one object.

As shown, the vehicle 102 may determine that there is a first probability of collision 608(1) at time 606(2), a second probability of collision 608(2) at time 606(3), and no probability of collision at time 606(4). The first probability of collision 608(1) may be associated with a low risk, the second probability of collision 608(2) may be associated with a high risk, and since there is no probability of collision at time 606(4), there is no risk of collision at time 606(4). In some instances, the first probability of collision 608(1) may be low risk based at least in part on the first probability of collision 608(1) being below a threshold probability. Additionally, the second probability of collision 608(2) may be high risk based at least in part on the second probability of collision 608(2) being equal to or greater than the threshold probability.

Although the example of FIG. 6 illustrates determining the probabilities of collision at discrete times, in some instances, the vehicle 102 may continuously be determining the probabilities of collision.

Figure 7:
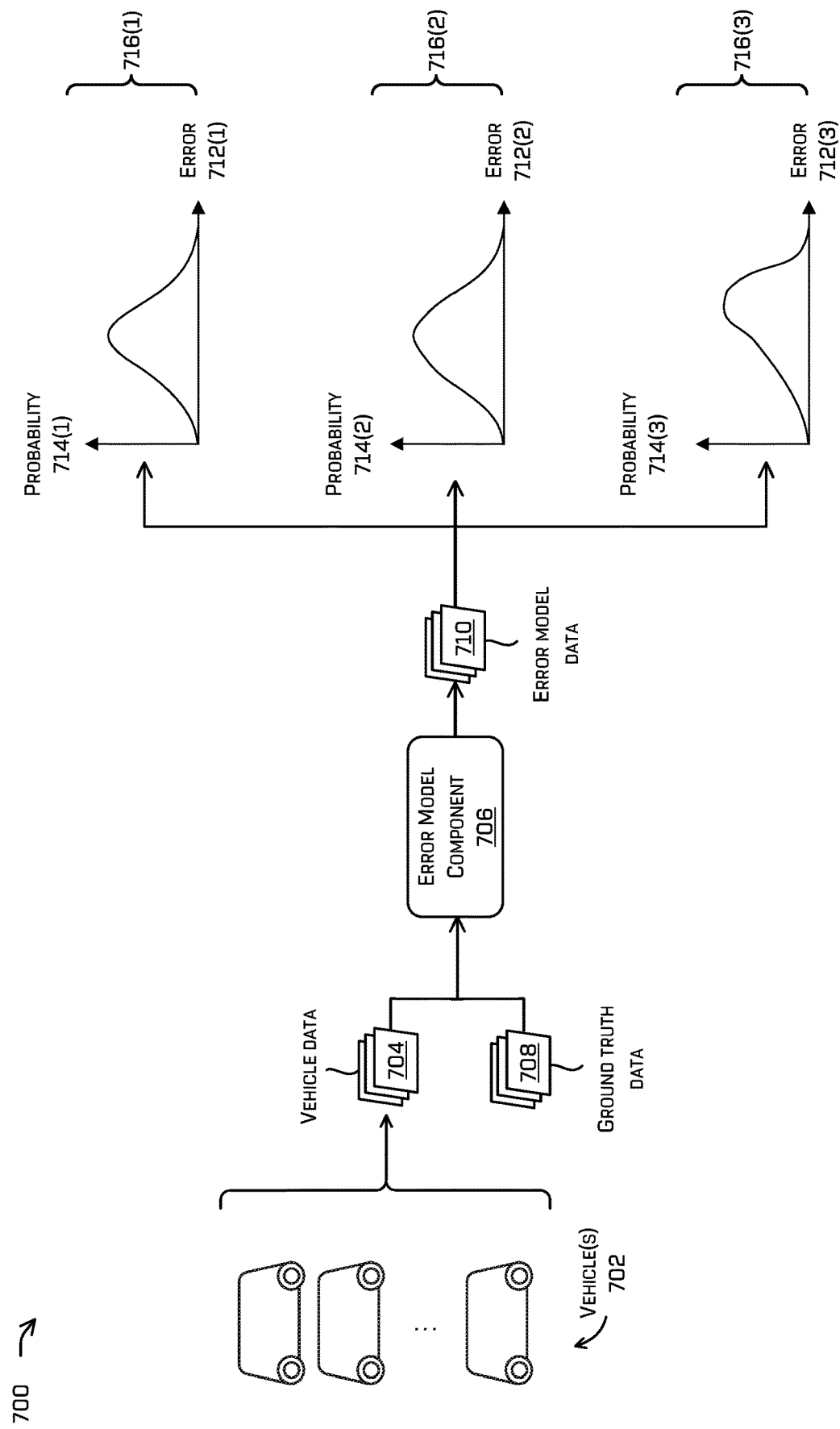
FIG. 7 illustrates generating error model data based at least in part on vehicle data and ground truth data, in accordance with embodiments of the present disclosure.

FIG. 7 illustrates an example 700 of generating error model data based at least in part on vehicle data and ground truth data, in accordance with embodiments of the present disclosure. As depicted in FIG. 7, vehicle(s) 702 can generate vehicle data 704 and transmit the vehicle data 704 to an error model component 706. As discussed herein, the error model component 706 can determine an error model 126 that can indicate an error associated with a parameter. For example, the vehicle data 704 can be data associated with a component of the vehicle(s) 702 such as the perception component 206, the planning component 208, the localization component 204, the estimation component 230, and/or the like. By way of example and without limitation, the vehicle data 704 can be associated with the perception component 206 and the vehicle data 704 can include a bounding box associated with an object detected by the vehicle(s) 702 in an environment.

The error model component 706 can receive ground truth data 708 which can be manually labeled and/or determined from other, validated, machine learned components. By way of example and without limitation, the ground truth data 708 can include a validated bounding box that is associated with the object in the environment. By comparing the bounding box of the vehicle data 704 with the bounding box of the ground truth data 708, the error model component 706 can determine an error associated with the system (e.g., the component) of the vehicle(s) 702. Such errors may comprise, for example, differences between the ground truth and the output, percent differences, error rates, and the like. In some instances, the vehicle data 704 can include one or more characteristics (also referred to as parameters) associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. Therefore, the error can be associated with the other characteristics (e.g., environmental parameters). In at least some examples, such error models may be determined for various groupings of parameters (e.g., distinct models for different combinations of classifications, distances, speeds, etc.). In at least some examples, such parameters may further comprise environmental information such as, but not limited to, the number of objects, the time of day, the time of year, weather conditions, and the like.

The error model component 706 can process a plurality of vehicle data 704 and a plurality of ground truth data 708 to determine error model data 710. The error model data 710 can include the error calculated by the error model component 706 which can be represented as error 712(1)-(3). Additionally, the error model component 706 can determine a probability associated with the error 712(1)-(3) represented as probability 714(1)-(3) which can be associated with an environmental parameter to present error models 716(1)-(3) (which may represent error models 126). By way of example and without limitation, the vehicle data 704 can include a bounding box associated with an object at a distance of 50 meters from the vehicle(s) 702 in an environment that includes rainfall. The ground truth data 708 can provide the validated bounding box associated with the object. The error model component 706 can determine error model data 710 that determines that the error associated with the perception system of the vehicle(s) 702. The distance of 50 meters and the rainfall can be used as environmental parameters to determine which of error model of error models 716(1)-(3) to use. Once the error model is identified, the error model 716(1)-(3) can provide an error 712(1)-(3) based on the probability 714(1)-(3) where errors 712(1)-(3) associated with higher probabilities 714(1)-(3) are more likely to be selected than errors 712(1)-(3) associated with lower probabilities 714(1)-(3).

Figure 8:
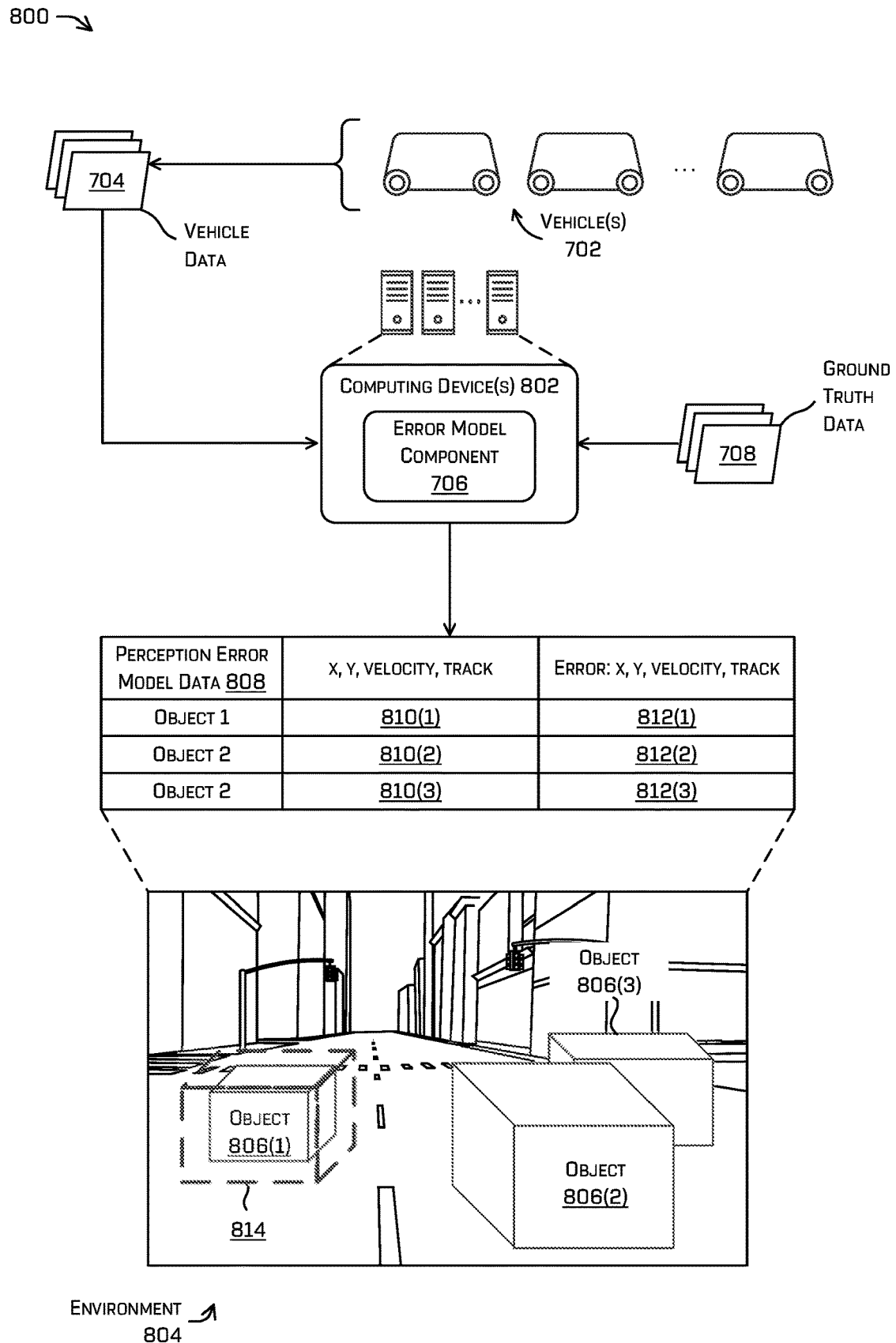
FIG. 8 illustrates computing device(s) generating perception error model data based at least in part on log data generated by the vehicle(s) and ground truth data, in accordance with embodiments of the present disclosure.

FIG. 8 illustrates an example 800 of the vehicle(s) 702 generating vehicle data 704 and transmitting the vehicle data 704 to the computing device(s) 802, in accordance with embodiments of the present disclosure. As discussed above, the error model component 706 can determine a perception error model that can indicate an error associated with a parameter. As discussed above, the vehicle data 704 can include sensor data generated by a sensor of the vehicle(s) 702 and/or perception data generated by a perception system of the vehicle(s) 702. The perception error model can be determined by comparing the vehicle data 704 against ground truth data 708. The ground truth data 708 can be manually labeled and can be associated with the environment and can represent a known result. Therefore, a deviation from the ground truth data 708 in the vehicle data 704 can be identified as an error in a sensor system and/or the perception system of the vehicle(s) 702. By way of example and without limitation, a perception system can identify an object as a bicyclist where the ground truth data 708 indicates that the object is a pedestrian. By way of another example and without limitation, a sensor system can generate sensor data that represents an object as having a width of 2 meters where the ground truth data 708 indicates that the object has a width of 3 meters.

As discussed above, the error model component 706 can determine a classification associated with the object represented in the vehicle data 704 and determine other objects of the same classification in the vehicle data 704 and/or other log data. Then the error model component 706 can determine a probability distribution associated with a range of errors of associated with the object. Based on the comparison and the range of errors, the error model component 706 can determine the estimated locations 502.

As depicted in FIG. 8, an environment 804 can include objects 806(1)-(3) represented as bounding boxes generated by a perception system. The perception error model data 808 can indicate scenario parameters as 810(1)-(3) and the error associated with the scenario parameters as 812(1)-(3).

Figure 9:
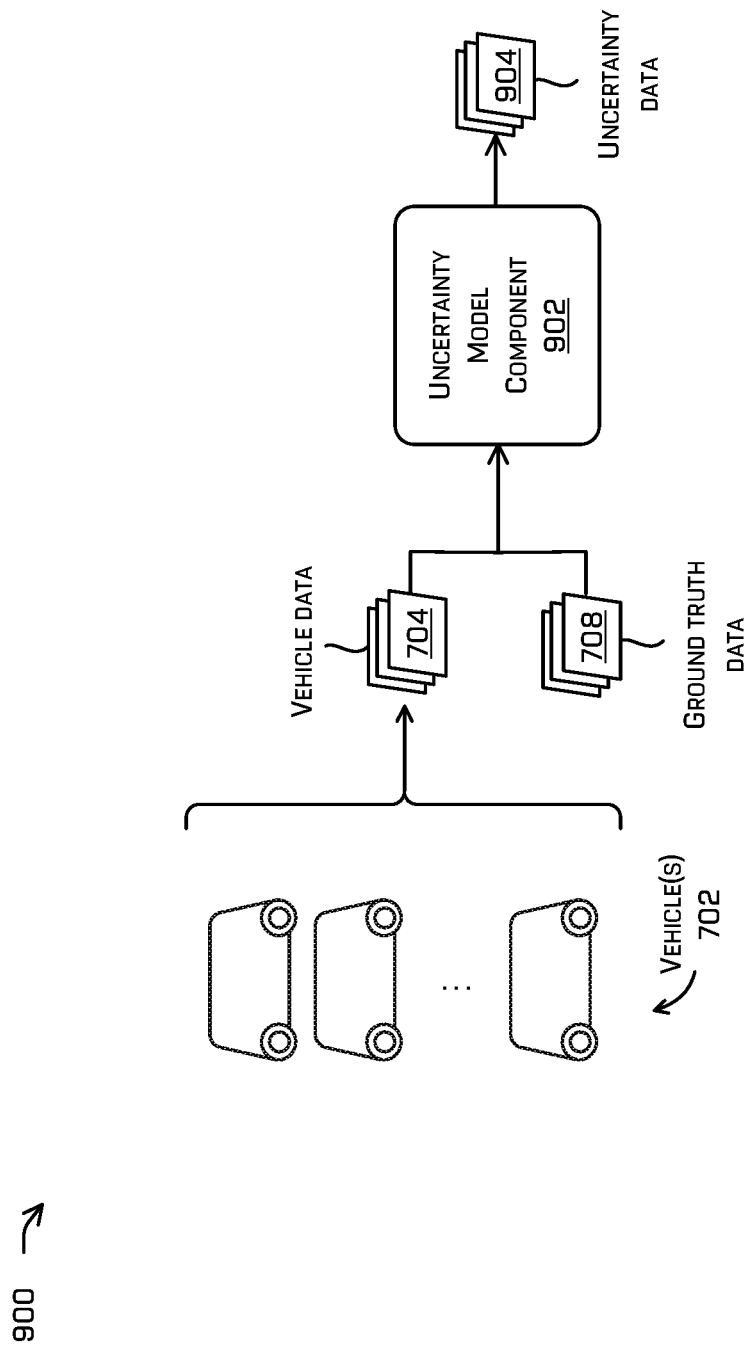
FIG. 9 illustrates generating uncertainty data based at least in part on vehicle data and ground truth data, in accordance with embodiments of the present disclosure.

FIG. 9 illustrates an example 900 of generating uncertainty data based at least in part on vehicle data and ground truth data, in accordance with embodiments of the present disclosure. As depicted in FIG. 9, the vehicle(s) 702 can generate the vehicle data 704 and transmit the vehicle data 704 to an uncertainty model component 902. As discussed herein, the uncertainty model component 902 can determine uncertainties associated with components determining parameters. For example, the vehicle data 704 can be data associated with a component of the vehicle(s) 702 such as the perception component 206, the planning component 208, the localization component 204, the prediction component 210, and/or the like. By way of example and without limitation, the vehicle data 704 can be associated with the perception component 206 and the vehicle data 704 can include a bounding box associated with an object detected by the vehicle(s) 702 in an environment.

The uncertainty model component 902 can receive ground truth data 708 which can be manually labeled and/or determined from other, validated, machine learned components. By way of example and without limitation, the ground truth data 708 can include a validated bounding box that is associated with the object in the environment. By comparing the vehicle data 704 with the ground truth data 708, the uncertainty model component 902 can determine a consistency for which the system (e.g., the component) of the vehicle(s) 702 determine the ground truth. For instance, the consistency may indicate the percentage for which the parameters represented by the vehicle data 704 are the same as the parameter represented by the ground truth data 708.

The uncertainty model component 902 may then use the consistency to generate uncertainty data 904 associated with the component that determine the parameter and/or associated with the component determining the parameter. For instance, if the consistency indicates that there is a low percentage, then the uncertainty data 904 may indicate a high uncertainty. However, if the consistency data indicates that there is a high percentage, then the uncertainty data 904 may indicate a low uncertainty.

For more detail, the uncertainty model component 902 may identify one or more types of uncertainty. The types of uncertainty may include, but are not limited to, epistemic uncertainty, aleatoric uncertainty (e.g., data-dependent, task-dependent, etc.), and/or the like. Epistemic uncertainty may be associated with ignorance about which a component generated data. Aleatoric uncertainty may be associated with uncertainty with respect to information for which the data cannot explain. The uncertainty model component 902 may then use the identified uncertainty(ies) to generate the uncertainty model(s) 130.

In some instances, the uncertainty model component 902 may input the data into a component multiple times, where one or more nodes of the component are changed when inputting the data, which causes the outputs of the component to differ. This may cause the range in the outputs from the component. In some instances, the component may further output the mean and/or the variance of the outputs. The uncertainty model component 902 may then use the distribution associated with the range of the outputs, the mean, and/or the variance to generate the uncertainty model(s) 130 for the component and/or the type of output (e.g., the parameter).

Figure 10:
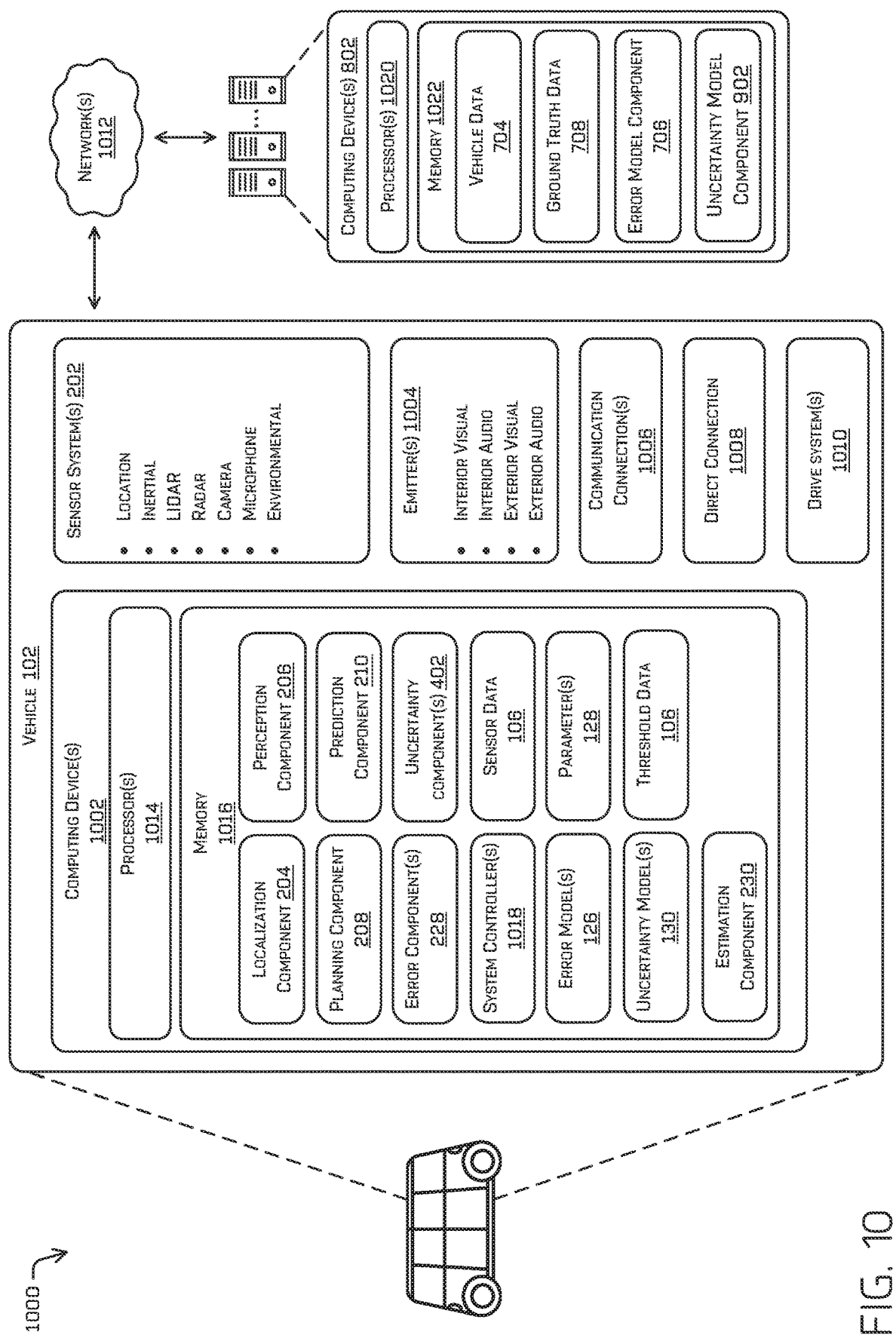
FIG. 10 depicts a block diagram of an example system for implementing the techniques described herein, in accordance with embodiments of the present disclosure.

FIG. 10 depicts a block diagram of an example system 1000 for implementing the techniques discussed herein. In at least one example, the system 1000 can include the vehicle 102. In the illustrated example 1000, the vehicle 102 is an autonomous vehicle; however, the vehicle 102 can be any other type of vehicle (e.g., a driver-controlled vehicle that may provide an indication of whether it is safe to perform various maneuvers).

The vehicle 102 can include computing device(s) 1002, one or more sensor system(s) 202, one or more emitter(s) 1004, one or more communication connection(s) 1006 (also referred to as communication devices and/or modems), at least one direct connection 1008 (e.g., for physically coupling with the vehicle 102 to exchange data and/or to provide power), and one or more drive system(s) 1010. The one or more sensor system(s) 202 can be configured to capture the sensor data 106 associated with an environment.

The sensor system(s) 202 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 202 can include multiple instances of each of these or other types of sensors. For instance, the time-of-flight sensors can include individual time-of-flight sensors located at the corners, front, back, sides, and/or top of the vehicle 102. As another example, the camera sensors can include multiple cameras disposed at various locations about the exterior and/or interior of the vehicle 102. The sensor system(s) 202 can provide input to the computing device(s) 1002.

The vehicle 102 can also include one or more emitter(s) 1004 for emitting light and/or sound. The one or more emitter(s) 1004 in this example include interior audio and visual emitters to communicate with passengers of the vehicle 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 1004 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 102 can also include one or more communication connection(s) 1006 that enable communication between the vehicle 102 and one or more other local or remote computing device(s) (e.g., a remote teleoperations computing device) or remote services. For instance, the communication connection(s) 1006 can facilitate communication with other local computing device(s) on the vehicle 102 and/or the drive system(s) 1010. Also, the communication connection(s) 1006 can allow the vehicle 102 to communicate with other nearby computing device(s) (e.g., other nearby vehicles, traffic signals, etc.).

The communications connection(s) 1006 can include physical and/or logical interfaces for connecting the computing device(s) 1002 to another computing device or one or more external network(s) 1012 (e.g., the Internet). For example, the communications connection(s) 1006 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 1006 may comprise the one or more modems as described in detail above.

In at least one example, the vehicle 102 can include one or more drive system(s) 1010. In some examples, the vehicle 102 can have a single drive system 1010. In at least one example, if the vehicle 102 has multiple drive systems 1010, individual drive systems 1010 can be positioned on opposite ends of the vehicle 102 (e.g., the front and the rear, etc.). In at least one example, the drive system(s) 1010 can include one or more sensor system(s) 202 to detect conditions of the drive system(s) 1010 and/or the surroundings of the vehicle 102. By way of example and not limitation, the sensor system(s) 202 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 1010. In some cases, the sensor system(s) 202 on the drive system(s) 1010 can overlap or supplement corresponding systems of the vehicle 102 (e.g., sensor system(s) 202).

The drive system(s) 1010 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1010 can include a drive system controller which can receive and preprocess data from the sensor system(s) 202 and to control operation of the various vehicle systems. In some examples, the drive system controller can include one or more processor(s) and memory communicatively coupled with the one or more processor(s). The memory can store one or more modules to perform various functionalities of the drive system(s) 1010. Furthermore, the drive system(s) 1010 also include one or more communication connection(s) that enable communication by the respective drive system with one or more other local or remote computing device(s).

The computing device(s) 1002 can include one or more processors 1014 and memory 1016 communicatively coupled with the processor(s) 1014. In the illustrated example, the memory 1016 of the computing device(s) 1002 stores the localization component 204, the perception component 206, the prediction component 210, the estimation component 230, the planning component 208, the error component(s) 228, the uncertainty component(s) 402, and one or more sensor system 202. Though depicted as residing in the memory 1016 for illustrative purposes, it is contemplated that the localization component 204, the perception component 206, the prediction component 210, the estimation component 230, the planning component 208, the error component(s) 228, the uncertainty component(s) 402, and the one or more system controller(s) 1018 can additionally, or alternatively, be accessible to the computing device(s) 1002 (e.g., stored in a different component of vehicle 102 and/or be accessible to the vehicle 102 (e.g., stored remotely).

In memory 1016 of the computing device(s) 1002, the localization component 204 can include functionality to receive data from the sensor system(s) 202 to determine a position of the vehicle 102. For example, the localization component 204 can include and/or request/receive a three-dimensional map of an environment and can continuously determine a location of the autonomous vehicle within the map. In some instances, the localization component 204 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 204 can provide data to various components of the vehicle 102 to determine an initial position of an autonomous vehicle for generating a trajectory, as discussed herein.

The perception component 206 can include functionality to perform object detection, segmentation, and/or classification. In some examples, the perception component 206 can provide processed sensor data that indicates a presence of an entity that is proximate to the vehicle 102 and/or a classification of the entity as an entity type (e.g., car, pedestrian, cyclist, building, tree, road surface, curb, sidewalk, unknown, etc.). In additional and/or alternative examples, the perception component 206 can provide processed sensor data that indicates one or more characteristics (also referred to as parameters) associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 206 can include functionality to store perception data generated by the perception component 206. In some instances, the perception component 206 can determine a track corresponding to an object that has been classified as an object type. For purposes of illustration only, the perception component 206, using sensor system(s) 202 can capture one or more images of an environment. The sensor system(s) 202 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 202, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 210 can generate one or more probability maps representing prediction probabilities of estimated locations of one or more objects in an environment. For example, the prediction component 210 can generate one or more probability maps for vehicles, pedestrians, animals, and the like within a threshold distance from the vehicle 102. In some instances, the prediction component 210 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 208 can determine a path for the vehicle 102 to follow to traverse through an environment. For example, the planning component 208 can determine various routes and paths and various levels of detail. In some instances, the planning component 208 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 208 can generate an instruction for guiding the vehicle 102 along at least a portion of the route from the first location to the second location. In at least one example, the planning component 208 can determine how to guide the vehicle 102 from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 208 can alternatively, or additionally, use data from the perception component 206 and/or the prediction component 210 to determine a path for the vehicle 102 to follow to traverse through an environment. For example, the planning component 208 and/or the prediction component 210 can receive data from the perception component 206 regarding objects associated with an environment. Using this data, the planning component 208 can determine a route to travel from a first location (e.g., a current location) to a second location (e.g., a target location) to avoid objects in an environment. In at least some examples, such a planning component 208 may determine there is no such collision free path and, in turn, provide a path which brings vehicle 102 to a safe stop avoiding all collisions and/or otherwise mitigating damage.

In at least one example, the computing device(s) 1002 can include one or more system controllers 1018, which can be configured to control steering, propulsion, braking, safety, emitters, communication, and other systems of the vehicle 102. These system controller(s) 1018 can communicate with and/or control corresponding systems of the drive system(s) 1010 and/or other components of the vehicle 102, which may be configured to operate in accordance with a path provided from the planning component 208.

The vehicle 102 can connect to computing device(s) 802 via the network(s) 1012 and can include one or more processors 1020 and memory 1022 communicatively coupled with the one or more processors 820. In at least one instance, the processor(s) 820 can be similar to the processor(s) 1014 and the memory 1022 can be similar to the memory 1016. In the illustrated example, the memory 1022 of the computing device(s) 802 stores the vehicle data 704, the ground truth data 708, and the error model component 706. Though depicted as residing in the memory 1022 for illustrative purposes, it is contemplated that the vehicle data 704, the ground truth data 708, and/or the error model component 706 can additionally, or alternatively, be accessible to the computing device(s) 802 (e.g., stored in a different component of computing device(s) 802 and/or be accessible to the computing device(s) 802 (e.g., stored remotely).

The processor(s) 1014 of the computing device(s) 1002 and the processor(s) 1020 of the computing device(s) 802 can be any suitable processor capable of executing instructions to process data and perform operations as described herein. By way of example and not limitation, the processor(s) 1014 and 1020 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 1016 of the computing device(s) 1002 and the memory 1022 of the computing device(s) 802 are examples of non-transitory computer-readable media. The memory 1016 and 1022 can store an operating system and one or more software applications, instructions, programs, and/or data to implement the methods described herein and the functions attributed to the various systems. In various implementations, the memory 1016 and 1022 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 1016 and 1022 can be implemented as a neural network.

FIGS. 11-14 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 11:
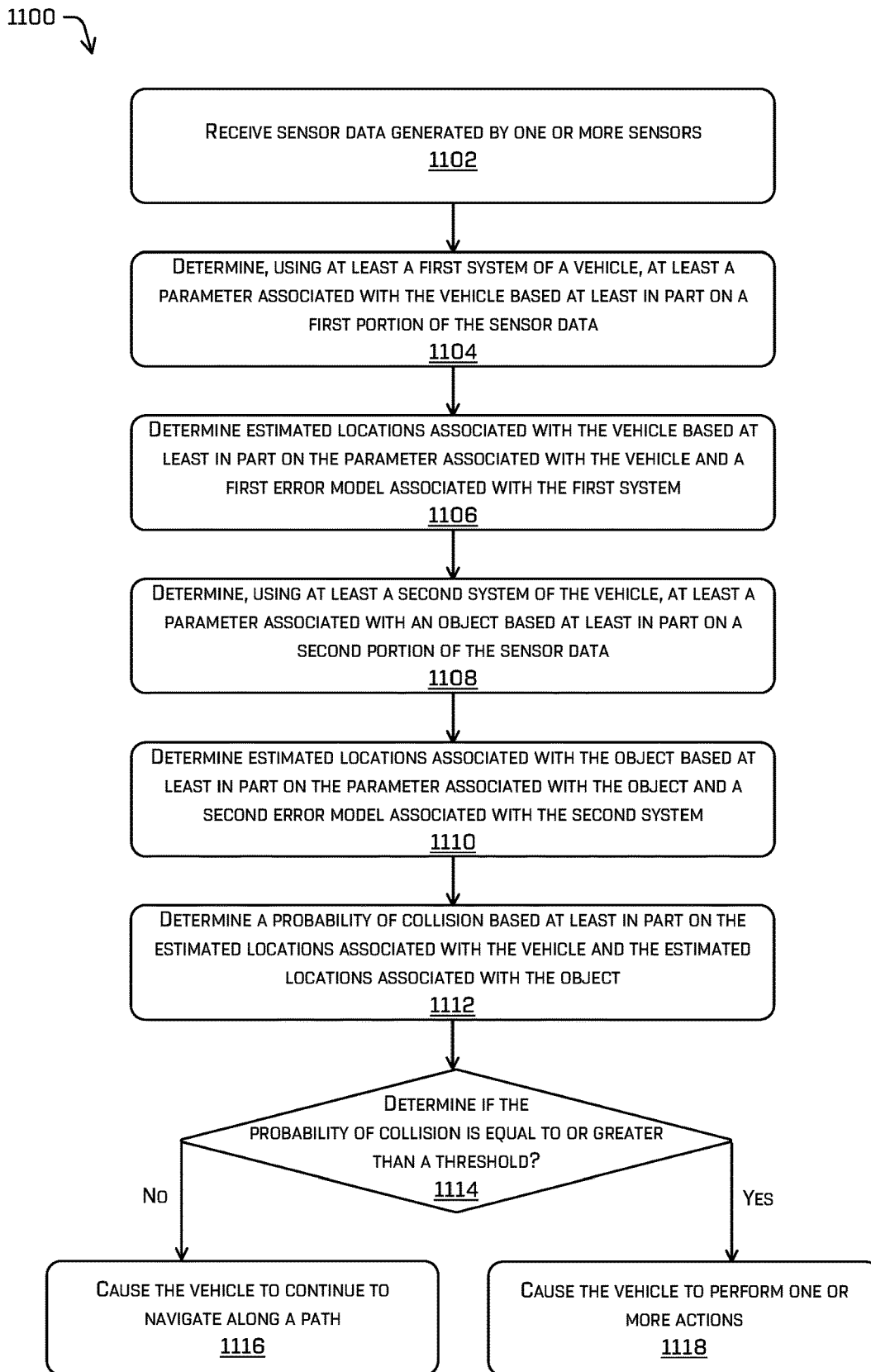
FIG. 11 depicts an example process for performing collision monitoring using error models, in accordance with embodiments of the disclosure.

FIG. 11 depicts an example process 1100 for performing collision monitoring using error models, in accordance with embodiments of the disclosure. At operation 1102, the process 1100 may include receiving sensor data generated by one or more sensors. For instance, the vehicle 102 may be navigating along a path from a first location to a second location. While navigating, the vehicle 102 may generate the sensor data using one or more sensors of the vehicle 102.

At operations 1104, the process 1100 may include determining, using at least a first system of a vehicle, at least a parameter associated with the vehicle based at least in part on a first portion of the sensor data. For instance, the vehicle 102 may analyze the first portion of the sensor data using one or more systems. The one or more systems may include, but are not limited to, a localization system, a perception system, a planning system, a prediction system, and/or the like. Based at least in part on the analysis, the vehicle 102 may determine the parameter associated with the vehicle 102. The parameter may include, but is not limited to, a location of the vehicle 102, a speed of the vehicle 102, a direction of travel of the vehicle 102, and/or the like.

At operation 1106, the process 1100 may include determining estimated locations associated with the vehicle based at least in part on the parameter associated with the vehicle and a first error model associated with the first system. For instance, the vehicle 102 may process at least the parameter associated with the vehicle 102 using the first error model. As discussed herein, the first error model can represent error(s) and/or error percentages associated with the output of the first system. Based at least in part on the processing, the vehicle 102 may determine the estimated locations associated with the vehicle 102 at a later time. As also discussed herein, the estimated locations may correspond to a probability distribution of locations.

At operations 1108, the process 1100 may include determining, using at least a second system of the vehicle, at least a parameter associated with an object based at least in part on a second portion of the sensor data. For instance, the vehicle 102 may analyze the sensor data and, based at least in part on the analysis, identify the object. The vehicle 102 may then analyze the second portion of the sensor data using the one or more systems. Based at least in part on the analysis, the vehicle 102 may determine the parameter associated with the object. The parameter may include, but is not limited to, a type of the object, a location of the object, a speed of the object, a direction of travel of the object, and/or the like.

At operation 1110, the process 1100 may include determining estimated locations associated with the object based at least in part on the parameter associated with the object and a second error model associated with the second system. For instance, the vehicle 102 may process at least the parameter associated with the object using the second error model. As discussed herein, the second error model can represent error(s) and/or error percentages associated with the output of the second system. Based at least in part on the processing, the vehicle 102 may determine the estimated locations associated with the object at the later time. As also discussed herein, the estimated locations may correspond to a probability distribution of locations.

At operation 1112, the process 1100 may include determining a probability of collision based at least in part on the estimated locations associated with the vehicle and the estimated locations associated with the object. For instance, the vehicle 102 may analyze the estimated locations associated with the vehicle 102 and the estimated locations associated with the object in order to determine the probability of collision. In some instances, the probability of collision may be based at least in part on an amount of overlap between the estimated locations associated with the vehicle 102 and the estimated locations associated with the object.

At operation 1114, the process 1100 may include determining if the probability of collision is equal to or greater than a threshold. For instance, the vehicle 102 may compare the probability of collision to the threshold in order to determine if the probability of collision is equal to or greater than the threshold.

If, at operation 1114 it is determined that the probability of collision is not equal to or greater than the threshold, then at operation 1116, the process 1100 may include causing the vehicle to continue to navigate along a path. For instance, if the vehicle 102 determines that the probability of collision is less than the threshold, then the vehicle 102 may continue to navigate along the path.

However, if at operation 1114 it is determined that the probability of collision is equal to or greater than the threshold, then at operation 1118, the process 1100 may include causing the vehicle to perform one or more actions. For instance, if the vehicle 102 determines that the probability of collision is equal to or greater than the threshold, then the vehicle 102 may perform the one or more actions. The one or more actions may include, but are not limited to, changing a path of the vehicle 102, changing a speed of the vehicle 102, parking the vehicle 102, and/or the like.

Figure 12:
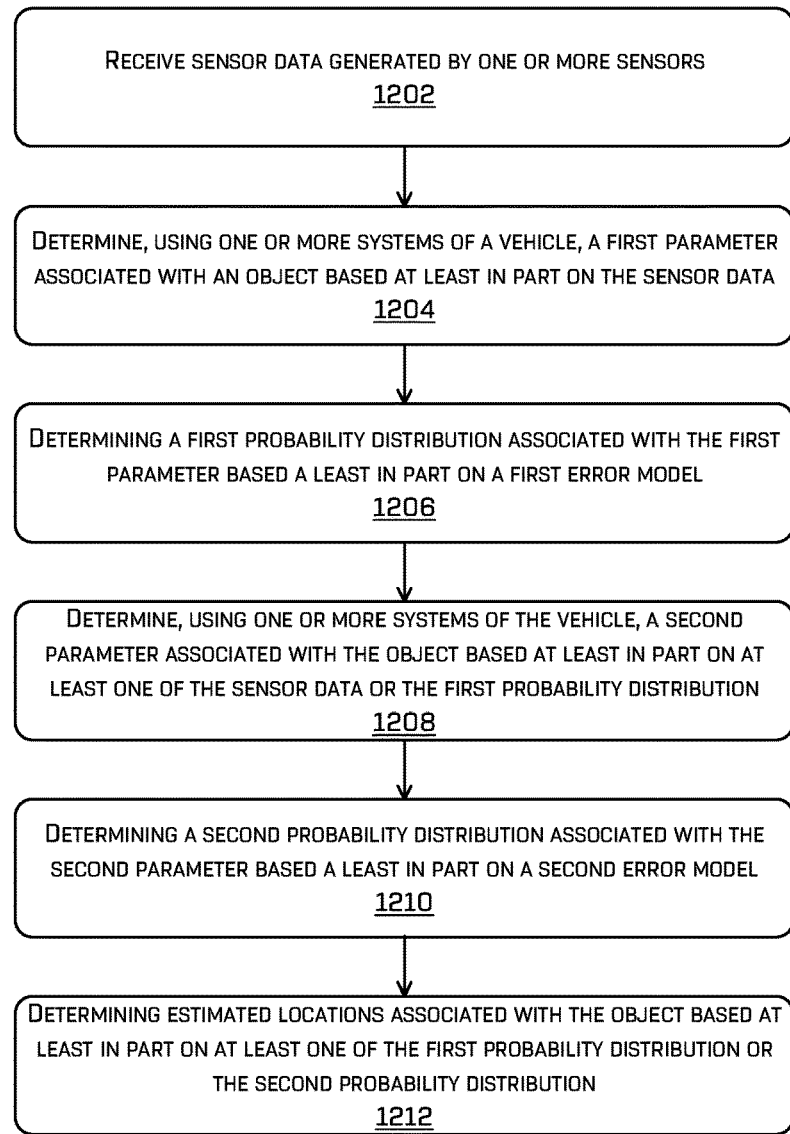
FIG. 12 depicts an example process for using error models to determine estimated locations associated with an object, in accordance with embodiments of the disclosure.

FIG. 12 depicts an example process 1200 for using error models to determine estimated locations associated with an object, in accordance with embodiments of the disclosure. At operation 1202, the process 1200 may include receiving sensor data generated by one or more sensors. For instance, the vehicle 102 may be navigating along a path from a first location to a second location. While navigating, the vehicle 102 may generate the sensor data using one or more sensors of the vehicle 102.

At operations 1204, the process 1200 may include determining, using one or more systems of a vehicle, a first parameter associated with an object based at least in part the sensor data. For instance, the vehicle 102 may analyze the sensor data using one or more systems. The one or more systems may include, but are not limited to, a localization system, a perception system, a planning system, a prediction system, and/or the like. Based at least in part on the analysis, the vehicle 102 may determine the first parameter associated with the object (e.g., the vehicle or another object). The first parameter may include, but is not limited to, a location of the object, a speed of the object, a direction of travel of the object, and/or the like.

At operation 1206, the process 1200 may include determining a first probability distribution associated with the first parameter based at least in part on a first error model. For instance, the vehicle 102 may process at least the first parameter using the first error model. As discussed herein, the first error model can represent error(s) and/or error percentages associated with the first parameter. Based at least in part on the processing, the vehicle 102 may determine the first probability distribution associated with the first parameter.

At operations 1208, the process 1200 may include determining, using one or more systems of the vehicle, a second parameter associated with the object based at least in part on at least one of the sensor data or the first probability distribution. For instance, the vehicle 102 may analyze the at least one of the sensor data or the first probability distribution using the one or more systems. In some instances, the vehicle 102 analyzes the first probability distribution when the second parameter is determined using the first parameter. Based at least in part on the analysis, the vehicle 102 may determine the second parameter associated with the object (e.g., the vehicle or another object). The second parameter may include, but is not limited to, a location of the object, a speed of the object, a direction of travel of the object, an estimated location of the object at a future time, and/or the like.

At operation 1210, the process 1200 may include determining a second probability distribution associated with the second parameter based at least in part on a second error model. For instance, the vehicle 102 may process at least the second parameter using the second error model. As discussed herein, the second error model can represent error(s) and/or error percentages associated with the second parameter. Based at least in part on the processing, the vehicle 102 may determine the second probability distribution associated with the second parameter.

At operation 1212, the process 1200 may include determining estimated locations associated with the object based at least in part on at least one of the first probability distribution or the second probability distribution. For instance, the vehicle 102 may determine the estimated locations based at least in part on the first probability distribution and/or the second probability distribution. In some instances, if the first parameter and the second parameter are independent, such as the first parameter indicating a current location of the object and the second parameter indicating a speed of the object, then the vehicle 102 may determine the estimated locations using both the first probability distribution and the second probability distribution. In some instances, if the second parameter is determined using the first parameter, such as if the second parameter indicates an estimated location of the object at a future time that is determined using the first parameter indicating the speed of the object, then the vehicle 102 may determine the estimated locations using the second probability distribution.

Figure 13A:
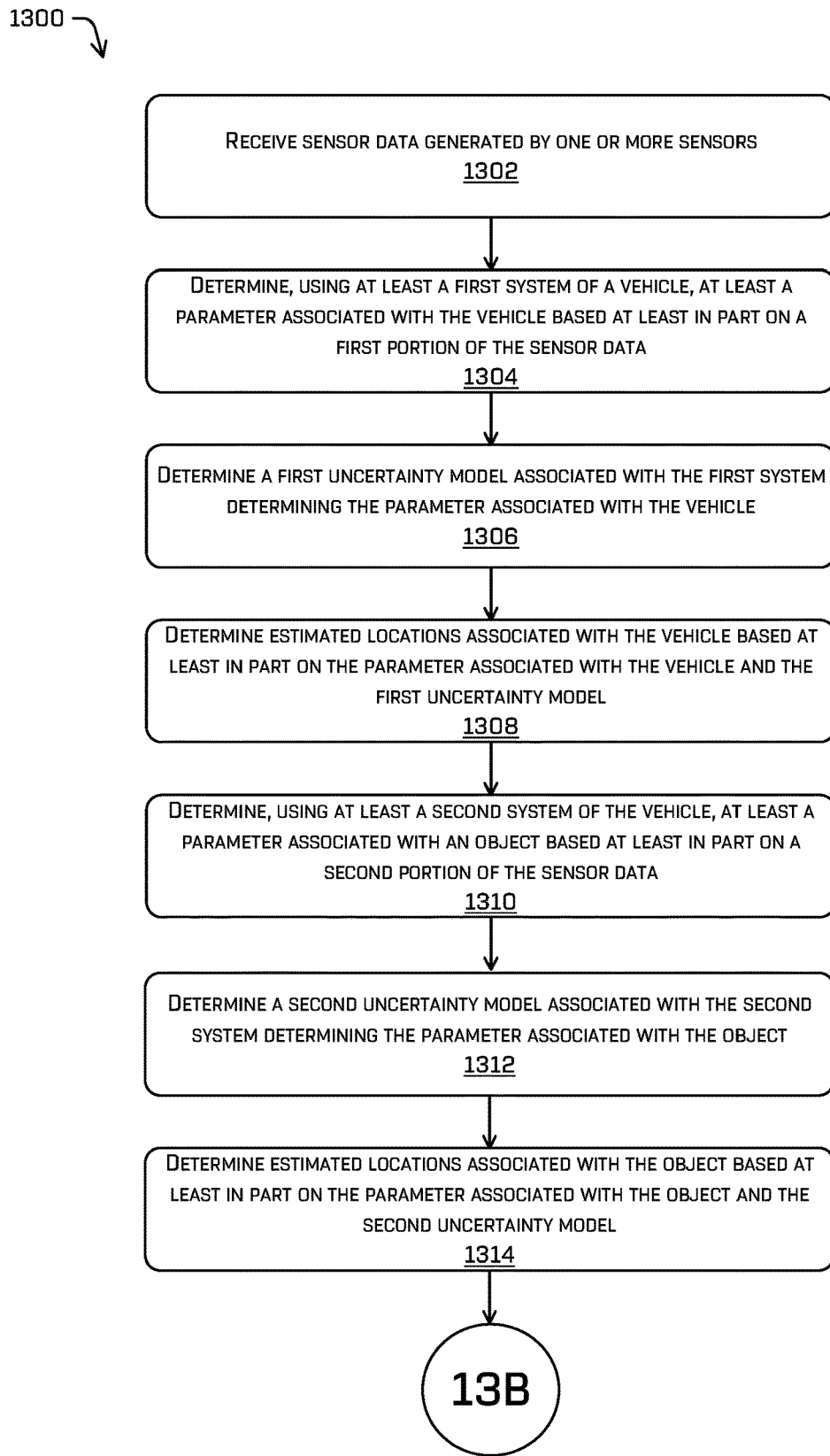
FIGS. 13A-13B depict an example process for performing collision monitoring using uncertainties, in accordance with embodiments of the disclosure.
Figure 13B:
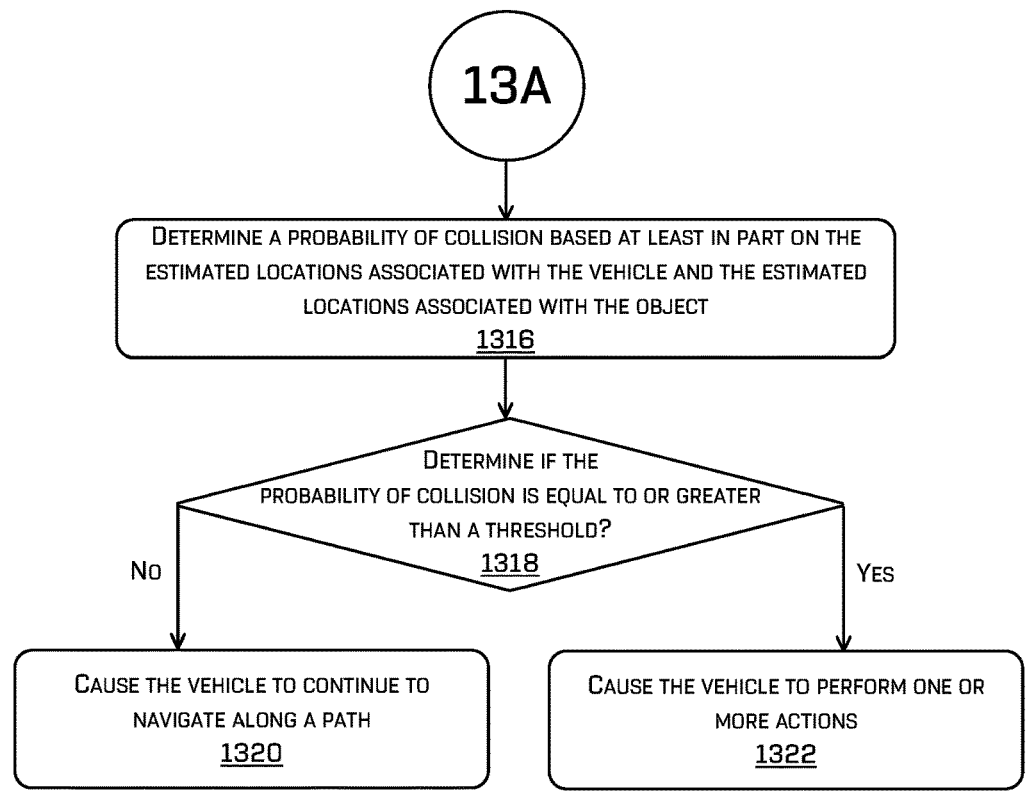

FIGS. 13A-13B depict an example process 1300 for performing collision monitoring using uncertainty models, in accordance with embodiments of the disclosure. At operation 1302, the process 1300 may include receiving sensor data generated by one or more sensors. For instance, the vehicle 102 may be navigating along a path from a first location to a second location. While navigating, the vehicle 102 may generate the sensor data using one or more sensors of the vehicle 102.

At operations 1304, the process 1300 may include determining, using at least a first system of a vehicle, at least a parameter associated with the vehicle based at least in part on a first portion of the sensor data. For instance, the vehicle 102 may analyze the first portion of the sensor data using one or more systems. The one or more systems may include, but are not limited to, a localization system, a perception system, a planning system, a prediction system, and/or the like. Based at least in part on the analysis, the vehicle 102 may determine the parameter associated with the vehicle 102. The parameter may include, but is not limited to, a location of the vehicle 102, a speed of the vehicle 102, a direction of travel of the vehicle 102, and/or the like.

At 1306, the process 1300 may include determining a first uncertainty model associated with the first system determining the parameter associated with the vehicle. For instance, the vehicle 102 may determine the first uncertainty model. In some instances, the vehicle 102 determines the first uncertainty model by receiving the first uncertainty model from the first system. In some instances, the vehicle 102 determines the first uncertainty model using uncertainty data indicating uncertainties associated with the first system determining the first parameter.

At operation 1308, the process 1300 may include determining estimated locations associated with the vehicle based at least in part on the parameter associated with the vehicle and the first uncertainty model. For instance, the vehicle 102 may process at least the parameter associated with the vehicle 102 using the first uncertainty model. Based at least in part on the processing, the vehicle 102 may determine the estimated locations associated with the vehicle 102 at a later time. As also discussed herein, the estimated locations may correspond to a probability distribution of locations.

At operations 1310, the process 1300 may include determining, using at least a second system of the vehicle, at least a parameter associated with an object based at least in part on a second portion of the sensor data. For instance, the vehicle 102 may analyze the sensor data and, based at least in part on the analysis, identify the object. The vehicle 102 may then analyze the second portion of the sensor data using the one or more systems. Based at least in part on the analysis, the vehicle 102 may determine the parameter associated with the object. The parameter may include, but is not limited to, a type of the object, a location of the object, a speed of the object, a direction of travel of the object, and/or the like.

At 1312, the process 1300 may include determining a second uncertainty model associated with the second system determining the parameter associated with the object. For instance, the vehicle 102 may determine the second uncertainty model. In some instances, the vehicle 102 determines the second uncertainty model by receiving the second uncertainty model from the second system. In some instances, the vehicle 102 determines the second uncertainty model using uncertainty data indicating uncertainties associated with the second system determining the second parameter.

At operation 1314, the process 1300 may include determining estimated locations associated with the object based at least in part on the parameter associated with the object and the second uncertainty model. For instance, the vehicle 102 may process at least the parameter associated with the object using the second uncertainty model. Based at least in part on the processing, the vehicle 102 may determine the estimated locations associated with the object at the later time. As also discussed herein, the estimated locations may correspond to a probability distribution of locations.

At operation 1316, the process 1300 may include determining a probability of collision based at least in part on the estimated locations associated with the vehicle and the estimated locations associated with the object. For instance, the vehicle 102 may analyze the estimated locations associated with the vehicle 102 and the estimated locations associated with the object in order to determine the probability of collision. In some instances, the probability of collision may be based at least in part on an amount of overlap between the estimated locations associated with the vehicle 102 and the estimated locations associated with the object.

At operation 1318, the process 1300 may include determining if the probability of collision is equal to or greater than a threshold. For instance, the vehicle 102 may compare the probability of collision to the threshold in order to determine if the probability of collision is equal to or greater than the threshold.

If, at operation 1318 it is determined that the probability of collision is not equal to or greater than the threshold, then at operation 1320, the process 1300 may include causing the vehicle to continue to navigate along a path. For instance, if the vehicle 102 determines that the probability of collision is less than the threshold, then the vehicle 102 may continue to navigate along the path.

However, if at operation 1318 it is determined that the probability of collision is equal to or greater than the threshold, then at operation 1322, the process 1300 may include causing the vehicle to perform one or more actions. For instance, if the vehicle 102 determines that the probability of collision is equal to or greater than the threshold, then the vehicle 102 may perform the one or more actions. The one or more actions may include, but are not limited to, changing a path of the vehicle 102, changing a speed of the vehicle 102, parking the vehicle 102, and/or the like.

It should be noted that, in some examples, the vehicle 102 may perform steps 1304-1314 using multiple possible routes associated with the vehicle 102. In such examples, the vehicle 102 may select the route that includes the lowest uncertainty and/or the lowest probability of collision.

Figure 14:
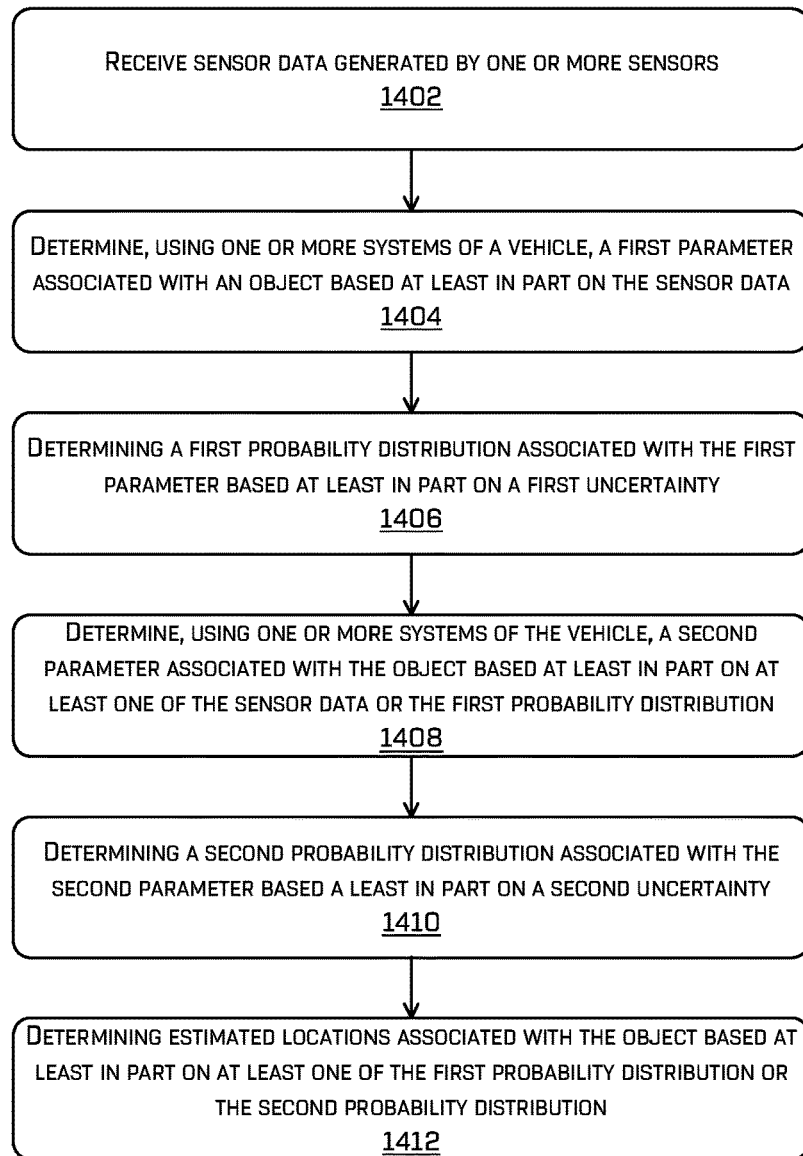
FIG. 14 depicts an example process for using uncertainties to determine estimated locations associated with an object, in accordance with embodiments of the disclosure.

FIG. 14 depicts an example process 1400 for using uncertainty models to determine estimated locations associated with an object, in accordance with embodiments of the disclosure. At operation 1402, the process 1400 may include receiving sensor data generated by one or more sensors. For instance, the vehicle 102 may be navigating along a path from a first location to a second location. While navigating, the vehicle 102 may generate the sensor data using one or more sensors of the vehicle 102.

At operations 1404, the process 1400 may include determining, using one or more systems of a vehicle, a first parameter associated with an object based at least in part the sensor data. For instance, the vehicle 102 may analyze the sensor data using one or more systems. The one or more systems may include, but are not limited to, a localization system, a perception system, a planning system, a prediction system, and/or the like. Based at least in part on the analysis, the vehicle 102 may determine the first parameter associated with the object (e.g., the vehicle or another object). The first parameter may include, but is not limited to, a location of the object, a speed of the object, a direction of travel of the object, and/or the like.

At operation 1406, the process 1400 may include determining a first probability distribution associated with the first parameter based at least in part on a first uncertainty model. For instance, the vehicle 102 may process at least the first parameter using the first uncertainty model. Based at least in part on the processing, the vehicle 102 may determine the first probability distribution associated with the first parameter.

At operations 1408, the process 1400 may include determining, using one or more systems of the vehicle, a second parameter associated with the object based at least in part on at least one of the sensor data or the first probability distribution. For instance, the vehicle 102 may analyze the at least one of the sensor data or the first probability distribution using the one or more systems. In some instances, the vehicle 102 analyze the first probability distribution when the second parameter is determined using the first parameter. Based at least in part on the analysis, the vehicle 102 may determine the second parameter associated with the object (e.g., the vehicle or another object). The second parameter may include, but is not limited to, a location of the object, a speed of the object, a direction of travel of the object, an estimated location of the object at a future time, and/or the like.

At operation 1410, the process 1400 may include determining a second probability distribution associated with the second parameter based at least in part on a second uncertainty model. For instance, the vehicle 102 may process at least the second parameter using the second uncertainty model. Based at least in part on the processing, the vehicle 102 may determine the second probability distribution associated with the second parameter.

At operation 1412, the process 1400 may include determining estimated locations associated with the object based at least in part on at least one of the first probability distribution or the second probability distribution. For instance, the vehicle 102 may determine the estimated locations based at least in part on the first probability distribution and/or the second probability distribution. In some instances, if the first parameter and the second parameter are independent, such as the first parameter indicating a current location of the object and the second parameter indicating a speed of the object, then the vehicle 102 may determine the estimated locations using both the first probability distribution and the second probability distribution. In some instances, if the second parameter is determined using the first parameter, such as if the second parameter indicates an estimated location of the object at a future time that is determined using the first parameter indicating the speed of the object, then the vehicle 102 may determine the estimated locations using the second probability distribution.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: An autonomous vehicle comprising: one or more sensors; one or more processors; and one or more computer-readable media storing instructions that, when executed by the one or more processors, cause the one or more processors to perform operations comprising: obtaining sensor data from the one or more sensors; determining, based at least in part on a first portion of the sensor data, an estimated location of the autonomous vehicle at a future time; determining, based at least in part on a system of the autonomous vehicle and a second portion of the sensor data, an estimated location of an object at the future time; determining, based at least in part on an error model and the estimated location of the object, a distribution of estimated locations associated with the object, the error model representing a probability of error associated with the system; determining a probability of collision between the autonomous vehicle and the object based at least in part on the estimated location of the autonomous vehicle and the distribution of estimated locations associated with the object; and causing the autonomous vehicle to perform one or more actions based at least in part on the probability of collision.

B: The autonomous vehicle as recited in paragraph A, the operations further comprising receiving, from one or more computing devices, the error model, the error model being generated using at least sensor data generated by one or more vehicles.

C: The autonomous vehicle as recited in either of paragraphs A or B, the operations further comprising: determining, based at least in part on an additional error model and the estimated location of the vehicle, a distribution of estimated locations associated with the autonomous vehicle, and wherein determining the probability of collision between the autonomous vehicle and the object comprises at least: determining an amount of overlap between the distribution of estimated locations associated with the autonomous vehicle and the distribution of estimated locations associated with the object; and determining the probability of collision based at least in part on the amount of overlap.

D: The autonomous vehicle as recited in any one of paragraphs A-C, wherein: the estimated location of the object at the future time is further determined based at least in part on an additional system of the autonomous vehicle; and the distribution of estimated locations is further determined based at least in part on an additional error model, the additional error model representing an error distribution associated with the additional system.

E: A method comprising: receiving sensor data from one or more sensors of a vehicle; determining, based at least in part on a first portion of the sensor data, an estimated location associated with the vehicle at a time; determining, based at least in part on a system of the vehicle and a second portion of the sensor data, a parameter associated with an object; determining, based at least in part on an error model and the parameter associated with the object, an estimated location associated with the object at the time, the error model representing a probability of error associated with the system; and causing the vehicle to perform one or more actions based at least in part on the estimated location associated with the vehicle and the estimated location associated with the object.

F: The method as recited in paragraph E, further comprising receiving, from one or more computing devices, the error model, the error model being generated using at least sensor data generated by one or more vehicles.

G: The method as recited in either paragraphs E or F, wherein the parameter comprises at least one of: an object type associated with the object; a location of the object within an environment; a speed of the object; or a direction of travel of the object within the environment.

H: The method as recited in any one of paragraphs E-F, wherein determining the estimated location associated with the vehicle at the time comprises at least: determining, based at least in part on an additional system of the vehicle and the first portion of the sensor data, a parameter associated with the vehicle; and determining, based at least in part on an additional error model and the parameter associated with the vehicle, the estimated location associated with the vehicle at the time, the additional error model representing a probability of error associated with the additional system.

I: The method as recited in any one of paragraphs E-H, further comprising: determining an additional estimated location associated with the object at the time based at least in part on the parameter, and wherein determining the estimated location associated with the object at the time comprises determining, based at least in part on the error model and the additional estimated location associated with the object, the estimated location associated with the object at the time.

J: The method as recited in any one of paragraphs E-I, wherein determining the estimated location associated with the object at the time comprises determining, based at least in part on the error model and the parameter associated with the object, a distribution of estimated locations associated with the object at the time.

K: The method as recited in any one of paragraphs E-J, wherein determining the estimated location associated with the vehicle comprise at least: determining, based at least in part on an additional system of the vehicle and the first portion of the sensor data, a parameter associated with the vehicle; and determining, based at least in part on an additional error model and the parameter associated with the vehicle, a distribution of estimated locations associated with the vehicle at the time, the additional error model representing a probability of error associated with the additional system.

L: The method as recited in any one of paragraphs E-K, further comprising: determining an amount of overlap between the distribution of estimated locations associated with the vehicle and the distribution of estimated locations associated with the object; and determining a probability of collision based at least in part on the amount of overlap, and wherein causing the vehicle to perform the one or more actions is based at least in part on the probability of collision.

M: The method as recited in any one of paragraphs E-L, further comprising selecting the error model based at least in part on the parameter.

N: The method as recited in any one of paragraphs E-M, further comprising: determining, based at least in part an additional system of the vehicle and the second portion the sensor data, an additional parameter associated with the object; and determining, based at least in part on an additional error model and the additional parameter associated with the object, an output associated with the object, the additional error model representing a probability of error associated with the additional system, and wherein determining the parameter associated with the object comprises determining, based at least in part on the system of the vehicle and the output, the parameter associated with the object.

O: The method as recited in any one of paragraphs E-N, wherein the system is a perception system and the additional system is a prediction system.

P: The method as recited in any one of paragraphs E-O, further comprising: determining, based at least in part on the first portion of the sensor data, an additional estimated location associated with the vehicle at an additional time that is later than the time; determining, based at least in part on the system of the vehicle and the second portion of the sensor data, an additional parameter associated with the object; determining, based at least in part on the error model and the additional parameter associated with the object, an additional estimated location associated with the object at the additional time; and causing the vehicle to perform one or more actions based at least in part on the additional estimated location associated with the vehicle and the additional estimated location associated with the object.

Q: The method as recited in any one of paragraphs E-P, further comprising: determining a probability of collision based at least in part on the estimated location associated with the vehicle and the estimated location associated with the object, and wherein causing the vehicle to perform the one or more actions comprises causing, based at least in part on the probability of collision, the vehicle to at least one of change a velocity or change a route.

R: One or more non-transitory computer-readable media storing instructions that, when executed by one or more processors, cause one or more computing devices to perform operations comprising: receiving sensor data generated by a sensor associated with a vehicle; determining, based at least in part on a portion of the sensor data, an estimated location associated with an object at the time; determining, based at least in part on the estimated location, an error model from a plurality of error models; determining, based at least in part on the error model and the estimated location, a distribution of estimated locations associated with the object; and determining one or more actions for navigating the vehicle based at least in part on distribution of estimated locations.

S: The one or more non-transitory computer-readable media as recited in paragraph R, the operation further comprising: determining, based at least in part on the portion of the sensor data, a parameter associated with the vehicle; determining the estimated location based at least in part on the parameter, and wherein the error model is associated with the parameter.

T: The one or more non-transitory computer-readable media as recited in either of paragraphs R or S, wherein determining the error model is further based at least in part on one or more of: a classification of the object, a speed of the object, a size of the object, a number of objects in the environment, a weather condition in the environment, a time of day, or a time of year.

U: An autonomous vehicle comprising: one or more sensors; one or more processors; and one or more computer-readable media storing instructions that, when executed by the one or more processors, cause the one or more processors to perform operations comprising: obtaining sensor data generated by the one or more sensors; determining, based at least in part on a first portion of the sensor data, an estimated location of the autonomous vehicle; determining, based at least in part a second portion of the sensor data, an estimated location of an object; determining an uncertainty model associated with the estimated location of the object; determining, based at least in part on the uncertainty model and the estimated location of the object, a distribution of estimated locations associated with the object; determining a probability of collision between the autonomous vehicle and the object based at least in part on the estimated location associated with the vehicle and probability of estimated locations associated with the object; and causing the autonomous vehicle to perform one or more actions based at least in part on the probability of collision.

V: The autonomous vehicle as recited in paragraph U, the operations further comprising: determining an additional uncertainty model associated with an additional system determining the estimated location of the autonomous vehicle; and determining, based at least in part on the additional uncertainty model and the estimated location of the autonomous vehicle, a probability of estimated locations associated with the autonomous vehicle, and wherein determining the probability of collision between the autonomous vehicle and the object comprises at least: determining an amount of overlap between the probability of estimated locations associated with the autonomous vehicle and the probability of estimated locations associated with the object; and determining the probability of collision based at least in part on the amount of overlap.

W: The autonomous vehicle as recited in either of paragraphs U or V, wherein: the estimated location of the object is further determined based at least in part on an additional system of the autonomous vehicle; the operations further comprise determining an additional uncertainty model associated with the additional system determining the estimated location of the object; and the probability of estimated locations is further determined based at least in part on the additional uncertainty model.

X: A method comprising: receiving sensor data from one or more sensors of a vehicle; determining, based at least in part on a first portion of the sensor data, an estimated location associated with the vehicle; determining, based at least in part on a system of the vehicle and a second portion of the sensor data, a parameter associated with an object; determining an uncertainty model associated with the system determining the parameter associated with the object; determining, based at least in part on the parameter associated with the object and the uncertainty model, an estimated location associated with the object; and causing the vehicle to perform one or more actions based at least in part on the estimated location associated with the vehicle and the estimated location associated with the object.

Y: The method as recited in paragraph X, further comprising receiving the uncertainty model from one or more computing devices, the uncertainty model being generated based at least in part on sensor data generated by one or more vehicles.

Z: The method as recited in either of paragraphs X or Y, wherein determining the parameter associated with the object comprises determining, based at least in part on the system and the second portion of the sensor data, at least one of: an object type associated with the object; a location of the object within an environment; a speed of the object; or a direction of travel of the object within the environment.

AA: The method as recited in any one of paragraphs X-Z, wherein determining the estimated location associated with the vehicle comprises at least: determining, based at least in part on an additional system of the vehicle and the first portion of the sensor data, a parameter associated with the vehicle; determining an additional uncertainty model associated with the additional system determining the parameter associated with the vehicle; and determining, based at least in part on the parameter associated with the vehicle and the additional uncertainty model, the estimated location associated with the vehicle.

AB: The method as recited in any one of paragraphs X-AA, further comprising: determining an additional estimated location associated with the object based at least in part on the parameter, and wherein determining the estimated location associated with the object comprises determining, based at least in part on the additional estimated location associated with the object and the uncertainty model, the estimated location associated with the object.

AC: The method as recited in any one of paragraphs X-AB, wherein determining the estimated location associated with the object comprises determining, based at least in part on the parameter associated with the object and the uncertainty model, a distribution of estimated locations associated with the object.

AD: The method as recited in any one of paragraphs X-AC, wherein determining the estimated location associated with the vehicle comprise at least: determining, based at least in part on an additional system of the vehicle and the first portion of the sensor data, a parameter associated with the vehicle; determining an additional uncertainty model associated with the additional system determining the parameter associated with the vehicle; and determining, based at least in part on the parameter associated with the vehicle and the additional uncertainty model, a distribution of estimated locations associated with the vehicle.

AE: The method as recited in any one of paragraphs X-AD, further comprising: determining an amount of overlap between the distribution of estimated locations associated with the vehicle and the distribution of estimated locations associated with the object; and determining a probability of collision based at least in part on the amount of overlap, and wherein causing the vehicle to perform the one or more actions is based at least in part on the probability of collision.

AF: The method as recited in any one of paragraphs X-AE, further comprising: determining, based at least in part on an additional system of the vehicle and a third portion the sensor data, an additional parameter associated with the object; and determining an additional uncertainty model associated with the additional system determining the additional parameter associated with the object, and wherein determining the estimated location associated with the object is further based at least in part on the additional parameter and the additional uncertainty model.

AG: The method as recited in any one of paragraphs X-AF, further comprising: determining, based at least in part on an additional system of the vehicle and the second portion the sensor data, an additional parameter associated with the object; determining an additional uncertainty model associated with the additional system determining the additional parameter associated with the object; and determining, based at least in part on the additional parameter associated with the object and the additional uncertainty model, an output associated with the object, and wherein determining the parameter associated with the object comprises determining, based at least in part on the system of the vehicle and the output, the parameter associated with the object.

AH: The method as recited in any one of paragraphs X-AG, further comprising: determining, based at least in part on the system of the vehicle and a third portion of the sensor data, a parameter associated with an additional object; determining an additional uncertainty model associated with the system determining the parameter associated with the additional object; determining, based at least in part the parameter associated with the additional object and the additional uncertainty model, an estimated location associated with the additional object; and wherein causing the vehicle to perform the one or more actions is further based at least in part on the estimated location associated with the additional object.

AI: The method as recited in any one of paragraphs X-AH, further comprising: determining a probability of collision based at least in part on the estimated location associated with the vehicle and the estimated location associated with the object, and wherein causing the vehicle to perform the one or more actions comprises causing, based at least in part on the probability of collision, the vehicle to at least one of change a velocity or change a route.

AJ: One or more non-transitory computer-readable media storing instructions that, when executed by one or more processors, cause one or more computing devices to perform operations comprising: receiving sensor data generated by a sensor associated with a vehicle; determining, based at least in part on a portion of the sensor data, an estimated location associated with an object; determining, based at least in part on the estimated location, an uncertainty model from a plurality of uncertainty models; determining, based at least in part on the uncertainty model and the estimated location, a distribution of estimated locations associated with the object; and determining one or more actions for navigating the vehicle based at least in part on distribution of estimated locations.

AK: The one or more non-transitory computer-readable media as recited in paragraph AJ, the operation further comprising: determining, based at least in part on the portion of the sensor data, a parameter associated with the vehicle; determining the estimated location based at least in part on the parameter, and wherein the uncertainty model is associated with the parameter.

AL: The one or more non-transitory computer-readable media as recited in either of paragraphs AJ or AK, the operation further comprising: determining, based at least in part on an additional portion of the sensor data, an estimated location associated with the vehicle; determining, based at least in part on the estimated location, an additional uncertainty model from the plurality of uncertainty models; and determining, based at least in part on the additional uncertainty model and the estimated location associated with the vehicle, a distribution of estimated locations associated with the vehicle, and wherein determining the one or more actions is further based at least in part on the distribution of estimated locations associated with the vehicle.

AM: The one or more non-transitory computer-readable media as recited in any one of paragraphs AJ-AL, the operation further comprising: determining a probability of collision based at least in part on the distribution of estimated locations associated with the vehicle and the distribution of estimated locations associated with the object, and wherein determining the one or more actions is based at least in part on the probability of collision.

AN: The one or more non-transitory computer-readable media as recited in any one of paragraphs AJ-AM, wherein determining the uncertainty model is further based at least in part on one or more of: a classification of the object, a speed of the object, a size of the object, a number of objects in the environment, a weather condition in the environment, a time of day, or a time of year.

What is claimed is:

1. An autonomous vehicle comprising:
   one or more sensors;
   one or more processors; and
   one or more computer-readable media storing instructions that, when executed by the one or more processors, cause the one or more processors to perform operations comprising:
   receiving sensor data generated by the one or more sensors;
   determining, based at least in part on a first portion of the sensor data, an estimated location of the autonomous vehicle;
   determining, based at least in part on a second portion of the sensor data, a first estimated location of an object;
   receiving an uncertainty model associated with the first estimated location of the object, the uncertainty model being determined based at least in part on inputting log data to a first system multiple times to determine a distribution of values of locations of an additional object represented in the log data;
   determining, based at least in part on the uncertainty model and the first estimated location of the object, an uncertainty distribution of estimated locations associated with the object, the uncertainty distribution of estimated locations including at least a first probability associated with the first estimated location and a second probability associated with a second estimated location;

determining a probability of collision between the autonomous vehicle and the object based at least in part on the estimated location associated with the autonomous vehicle and the uncertainty distribution of estimated locations associated with the object; and causing the autonomous vehicle to perform one or more actions based at least in part on the probability of collision.

2. The autonomous vehicle as recited in claim 1, the operations further comprising:

determining an additional uncertainty model associated with a second system determining the estimated location of the autonomous vehicle; and determining, based at least in part on the additional uncertainty model and the estimated location of the autonomous vehicle, a distribution of estimated locations associated with the autonomous vehicle, wherein determining the probability of collision between the autonomous vehicle and the object comprises at least:

determining an amount of overlap between the distribution of estimated locations associated with the autonomous vehicle and the uncertainty distribution of estimated locations associated with the object; and determining the probability of collision based at least in part on the amount of overlap.

3. The autonomous vehicle as recited in claim 1, wherein:

the operations further comprise determining an additional uncertainty model associated with the first system determining the first estimated location of the object; and the uncertainty distribution of estimated locations is further determined based at least in part on the additional uncertainty model.

4. A method comprising:

receiving sensor data from one or more sensors of a vehicle;

determining, based at least in part on a first portion of the sensor data, an estimated location associated with the vehicle;

determining, based at least in part on a system of the vehicle and a second portion of the sensor data, a first estimated location associated with an object;

receiving an uncertainty model associated with the system determining the first estimated location associated with the object, the uncertainty model being determined based at least in part on repeatedly inputting log data into the system to determine a distribution of values of locations of an additional object represented in the log data;

determining, based at least in part on the first estimated location associated with the object and the uncertainty model, an uncertainty distribution of estimated locations associated with the object, the uncertainty distribution of estimated locations including at least a first probability associated with the first estimated location associated with the object and a second probability associated with a second estimated location associated with the object; and causing the vehicle to perform one or more actions based at least in part on the estimated location associated with the vehicle and the uncertainty distribution of estimated locations associated with the object.

5. The method as recited in claim 4, further comprising receiving the uncertainty model from one or more computing devices, the uncertainty model being generated based at least in part on sensor data generated by one or more vehicles.

6. The method as recited in claim 5, wherein determining the estimated location associated with the vehicle comprise at least:

determining, based at least in part on an additional system of the vehicle and the first portion of the sensor data, a parameter associated with the vehicle;

determining an additional uncertainty model associated with the additional system determining the parameter associated with the vehicle; and determining, based at least in part on the parameter associated with the vehicle and the additional uncertainty model, a distribution of estimated locations associated with the vehicle.

7. The method as recited in claim 6, further comprising:

determining an amount of overlap between the distribution of estimated locations associated with the vehicle and the uncertainty distribution of estimated locations associated with the object; and determining a probability of collision based at least in part on the amount of overlap, wherein causing the vehicle to perform the one or more actions is based at least in part on the probability of collision.

8. The method as recited in claim 4, wherein determining the estimated location associated with the vehicle comprises at least:

determining, based at least in part on an additional system of the vehicle and the first portion of the sensor data, a parameter associated with the vehicle;

determining an additional uncertainty model associated with the additional system determining the parameter associated with the vehicle; and determining, based at least in part on the parameter associated with the vehicle and the additional uncertainty model, the estimated location associated with the vehicle.

9. The method as recited in claim 4, further comprising:

determining, based at least in part on an additional system of the vehicle and a third portion of the sensor data, a parameter associated with the object; and determining an additional uncertainty model associated with the additional system determining the parameter associated with the object, wherein determining the first estimated location associated with the object is further based at least in part on the parameter and the additional uncertainty model.

10. The method as recited in claim 4, further comprising:

determining, based at least in part on an additional system of the vehicle and the second portion the sensor data, a parameter associated with the object;

determining an additional uncertainty model associated with the additional system determining the parameter associated with the object; and determining, based at least in part on the parameter associated with the object and the additional uncertainty model, an output associated with the object, wherein determining the first estimated location associated with the object comprises determining, based at least in part on the system of the vehicle and the output, the first estimated location associated with the object.

11. The method as recited in claim 4, further comprising:

determining, based at least in part on the system of the vehicle and a third portion of the sensor data, a parameter associated with an additional object;

determining an additional uncertainty model associated with the system determining the parameter associated with the additional object; and determining, based at least in part on the parameter associated with the additional object and the additional uncertainty model, an estimated location associated with the additional object, wherein causing the vehicle to perform the one or more actions is further based at least in part on the estimated location associated with the additional object.

12. The method as recited in claim 4, further comprising:
determining a probability of collision based at least in part on the estimated location associated with the vehicle and the uncertainty distribution of estimated locations associated with the object, wherein causing the vehicle to perform the one or more actions comprises causing, based at least in part on the probability of collision, the vehicle to at least one of change a velocity or change a route.

13. The method as recited in claim 4, wherein the first estimated location is associated with an area of an environment, and wherein the second estimated location at least partially surrounds the area.

14. The method as recited in claim 4, wherein the first probability is greater than the second probability.

15. One or more non-transitory computer-readable media storing instructions that, when executed by one or more processors, cause one or more computing devices to perform operations comprising:

receiving sensor data generated by a sensor associated with a vehicle;

determining, based at least in part on a portion of the sensor data, a first estimated location associated with an object;

receiving an uncertainty model determined from a plurality of uncertainty models based at least in part on the first estimated location and log data, the uncertainty model being determined based at least in part on repeatedly inputting the log data into a system associated with the vehicle to determine a distribution of values of locations of an additional object represented in the log data;

determining, based at least in part on the uncertainty model and the first estimated location, an uncertainty distribution of estimated locations associated with the object, the uncertainty distribution of estimated locations including at least a first probability associated with the first estimated location and a second probability associated with a second estimated location; and determining one or more actions for navigating the vehicle based at least in part on the uncertainty distribution of estimated locations.

16. The one or more non-transitory computer-readable media as recited in claim 15, the operation further comprising:

determining, based at least in part on the portion of the sensor data, a parameter associated with the object; and determining the first estimated location based at least in part on the parameter, wherein the uncertainty model is associated with the parameter.

17. The one or more non-transitory computer-readable media as recited in claim 15, the operation further comprising:

determining, based at least in part on an additional portion of the sensor data, an estimated location associated with the vehicle;

determining, based at least in part on the estimated location associated with the vehicle, an additional uncertainty model from the plurality of uncertainty models; and determining, based at least in part on the additional uncertainty model and the estimated location associated with the vehicle, a distribution of estimated locations associated with the vehicle, wherein determining the one or more actions is further based at least in part on the distribution of estimated locations associated with the vehicle.

18. The one or more non-transitory computer-readable media as recited in claim 17, the operation further comprising:

determining a probability of collision based at least in part on the distribution of estimated locations associated with the vehicle and the uncertainty distribution of estimated locations associated with the object, wherein determining the one or more actions is based at least in part on the probability of collision.

19. The one or more non-transitory computer-readable media as recited in claim 15, wherein determining the uncertainty model is further based at least in part on one or more of:

a classification of the object,
a speed of the object,
a size of the object,
a number of objects in an environment of the vehicle,
a weather condition in the environment,
a time of day, or
a time of year.

20. The one or more non-transitory computer-readable media as recited in claim 15, wherein the first estimated location is associated with an area of an environment, and wherein the second estimated location at least partially surrounds the area.

* * * * *